US011872957B2

(12) United States Patent
Herbert et al.

(10) Patent No.: US 11,872,957 B2
(45) Date of Patent: Jan. 16, 2024

(54) CHILD PRESENCE DETECTION WARNING SUPPRESSION

(71) Applicant: Veoneer US, LLC, Southfield, MI (US)

(72) Inventors: Thomas Herbert, Ogden, UT (US); Josip Krnjajic, Southfield, MI (US)

(73) Assignee: VEONEER US LLC, Wilmington, DE (US)

( * ) Notice: Subject to any disclaimer, the term of this patent is extended or adjusted under 35 U.S.C. 154(b) by 247 days.

(21) Appl. No.: 17/557,094

(22) Filed: Dec. 21, 2021

(65) Prior Publication Data
US 2023/0192035 A1 Jun. 22, 2023

(51) Int. Cl.
B60R 25/31 (2013.01)
B60R 25/01 (2013.01)
B60R 25/10 (2013.01)
B60R 25/20 (2013.01)

(52) U.S. Cl.
CPC .............. B60R 25/31 (2013.01); B60R 25/01 (2013.01); B60R 25/1004 (2013.01); B60R 25/20 (2013.01); B60R 2325/101 (2013.01); B60R 2325/106 (2013.01); B60R 2325/205 (2013.01)

(58) Field of Classification Search
CPC ..... B60R 25/31; B60R 25/01; B60R 25/1004; B60R 25/20; B60R 2325/101; B60R 2325/106; B60R 2325/205; G08B 21/24; G08B 25/001; G08B 21/22
See application file for complete search history.

(56) References Cited

U.S. PATENT DOCUMENTS

| 8,659,414 | B1* | 2/2014 | Schuk .................... G08B 21/22 340/687 |
| 10,124,724 | B2* | 11/2018 | Huntzicker .............. G07C 5/08 |
| 10,848,610 | B1* | 11/2020 | Luo ......................... B60R 22/48 |
| 11,436,909 | B2* | 9/2022 | Clemmons-Trigueros .................. G08B 21/24 |
| 11,462,092 | B2* | 10/2022 | Sadolfo .................. G08B 21/22 |
| 2009/0027188 | A1* | 1/2009 | Saban .................... B60N 2/002 340/439 |
| 2013/0106598 | A1* | 5/2013 | Silveira .................. B60N 2/002 340/457 |
| 2014/0253314 | A1* | 9/2014 | Rambadt ................ B60N 2/002 340/457.1 |
| 2019/0143944 | A1 | 5/2019 | Park |
| 2019/0272729 | A1 | 9/2019 | Staninger |

(Continued)

FOREIGN PATENT DOCUMENTS

EP 3446917 2/2019
EP 3846143 7/2021

Primary Examiner — Nay Tun

(57) ABSTRACT

A system comprising a radar device and a mobile device. The radar device may be configured to operate when a vehicle is turned off, detect a presence of a person in the vehicle, determine an age range of the person detected and generate an alert signal in response to a presence signal and determining that the age range of the person detected corresponds to a child. The mobile device may be configured to communicate the presence signal to the radar device and determine a movement of the mobile device. The radar device may determine a distance of the mobile device from the vehicle in response to the presence signal. The radar device may suppress the alert signal when the distance of the mobile device is within a predetermined range of the vehicle and the mobile device is moving.

20 Claims, 11 Drawing Sheets

(56) References Cited

U.S. PATENT DOCUMENTS

2021/0209927 A1* 7/2021 Hedges ................ G08B 25/005
2022/0130155 A1* 4/2022 Herbst ...................... G06T 7/20
2022/0179432 A1* 6/2022 Nojoumian ............. H04L 67/12

* cited by examiner

CHILD PRESENCE DETECTION WARNING SUPPRESSION

FIELD OF THE INVENTION

The invention relates to vehicle sensors generally and, more particularly, to a method and/or apparatus for implementing child presence detection warning suppression.

BACKGROUND

Regulations for vehicles are starting to require child presence detection for all upcoming vehicles. European regulations for presence detection in vehicles are aligning with the US (i.e., the "Hot Car Act"). Various regulations propose that vehicles be capable of providing alerts in scenarios when children are left in vehicles (as well as other occupants, such as the elderly, adults, pets, etc.).

Conventional detection solutions are capable of detecting the presence of people in vehicles. While the regulations propose a noble goal, overly broad alerts can become a nuisance. Vehicle owners that become annoyed with excessive alerts often search for workarounds to disable the alerts. If a vehicle owner disables all alerts to prevent annoyances, then alerts will not be available in real emergency scenarios. There may be scenarios where a driver or other adults leave a vehicle where a warning is not necessary, or helpful. Even though a child is left inside the car, the child is not unattended. Merely detecting the presence of a child alone inside a vehicle while the vehicle is off does not provide enough data to provide alarms that are helpful while preventing alarms that are unneeded.

It would be desirable to implement child presence detection warning suppression.

SUMMARY

The invention concerns a system comprising a radar device and a mobile device. The radar device may be configured to operate when a vehicle is turned off, detect a presence of a person in the vehicle, determine an age range of the person detected and generate an alert signal in response to a presence signal and determining that the age range of the person detected corresponds to a child. The mobile device may be configured to communicate the presence signal to the radar device and determine a movement of the mobile device. The radar device may determine a distance of the mobile device from the vehicle in response to the presence signal. The radar device may suppress the alert signal when the distance of the mobile device is within a predetermined range of the vehicle and the mobile device is moving.

BRIEF DESCRIPTION OF THE FIGURES

Embodiments of the invention will be apparent from the following detailed description and the appended claims and drawings.

FIG. 11 is a flow diagram illustrating a method for adjusting an alert timer in response to detecting whether a child is attended to.

DETAILED DESCRIPTION OF THE EMBODIMENTS

Figure 1:
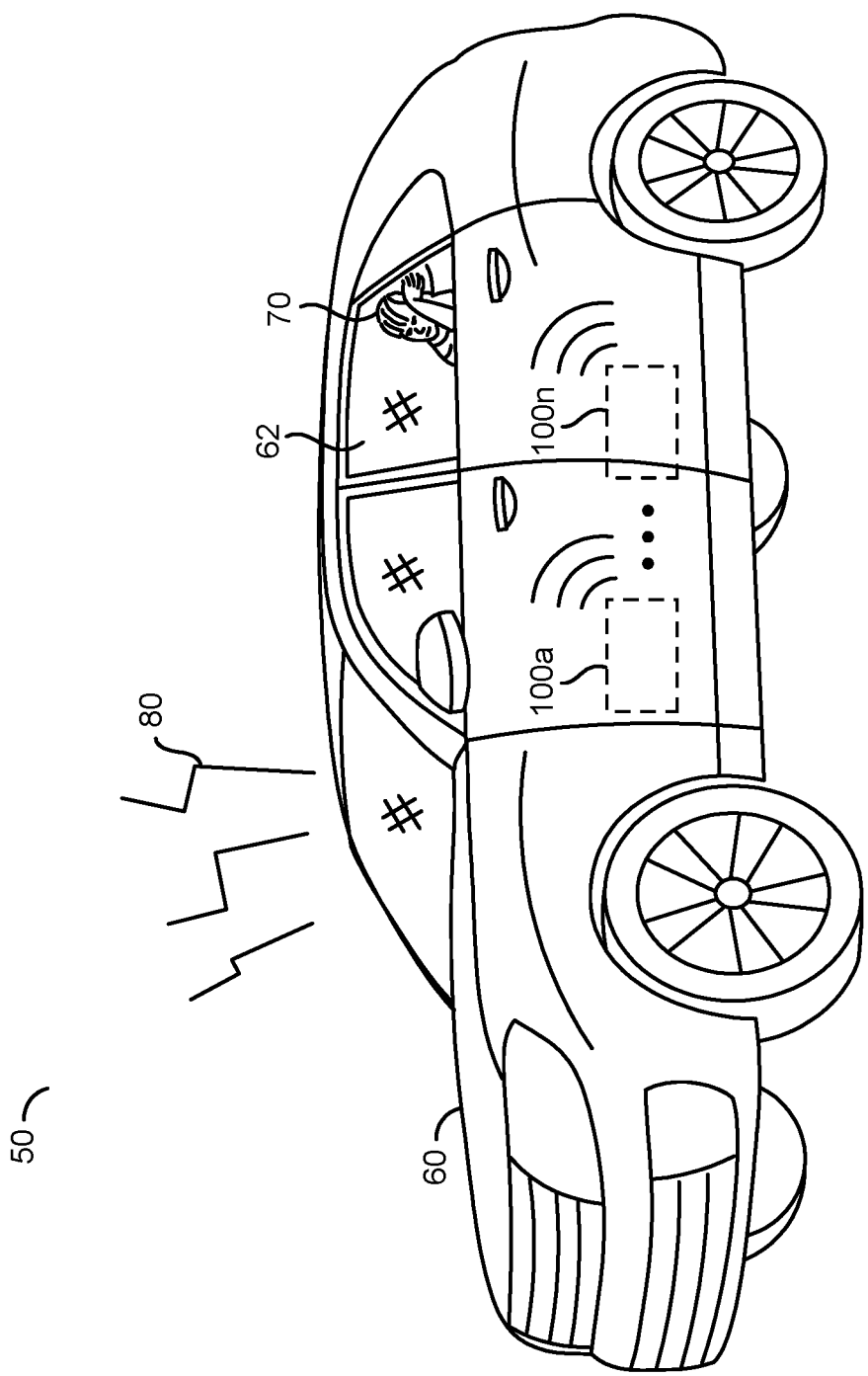
FIG. 1 is a diagram illustrating a vehicle providing an alert with a child left inside.

Embodiments of the present invention include providing child presence detection warning suppression that may (i) detect a presence of a person in a vehicle while the vehicle is powered off, (ii) detect adults near a vehicle, (iii) use smartphone location and motion information as a proxy for location of an adult, (iv) operate efficiently to limit power consumption, (v) enable an alarm when a child is unattended, (vi) intelligently suppress an alarm when a child is alone in a vehicle but not unattended to prevent alarms from being generated excessively, (vii) use motion information to ensure that a wireless device is not left in the vehicle, (viii) enable an alarm to be generated before an alarm time limit based on distance information and/or (ix) be implemented as one or more integrated circuits.

Embodiments of the present invention may be configured to implement in cabin monitoring systems (ICMS). The ICMS may be configured to operate while a vehicle is turned off and/or the vehicle doors are closed/locked to monitor for the presence of occupants that may be left inside the vehicle. The ICMS may be configured to control the generation of alerts and/or other responses based on whether the detected occupants are left unattended. In one example, the ICMS may be configured to provide enhancements to EU and US regulations regarding people (e.g., children) being left in locked vehicles.

Embodiments of the present invention may be configured to implement a radar device and/or communication (e.g., mobile) devices in the vehicle. The radar device may be configured to detect the presence and/or characteristics of any living beings (e.g., children, adults, the elderly, animals, etc.). Instead of relying solely on presence detection, the communication devices may be implemented to monitor for the location of adults (e.g., a vehicle owner) near the vehicle. The combination of the radar device and location information may be configured to determine whether a vehicle occupant has been left unattended.

The radar device and/or mobile devices may remain active after the vehicle is shut off (e.g., approximately 30 minutes after the vehicle is powered down). Similarly, the radar device and/or mobile devices may remain active while the doors of the vehicle are locked or closed (e.g., a driver leaves the vehicle). When a child is left unattended in a vehicle, an alarm may be generated based on a time with doors locked and vehicle off. The alarm may be generated to trigger a warning about a child being left unattended in the vehicle. The radar device and the mobile devices may be configured to suppress the alarm when the adult (e.g., the driver) leaves the vehicle but the child is not actually left unattended (e.g., the driver parks the car and picks up the mail at the end of the driveway before retrieving the child, the driver exits the car to fill up the gas tank and/or connect the battery charger, the driver clears snow from the driveway, etc.).

Embodiments of the present invention may be configured to provide a tailored warning system to provide warnings when appropriate, and suppress warnings when unnecessary. When the vehicle is turned off (e.g., powered down, idling, engine not running, etc.), a communication device may enable a connection (e.g., via Bluetooth, Wi-Fi or other communications protocol) to track a smartphone of the vehicle owner. The vehicle may be in a low power operating state (e.g., many components of the vehicle may not be active when the vehicle is turned off). The smartphone may provide information that may be used to determine a distance to the vehicle. In addition to distance, some motion information (e.g., readings from inertial sensors on the smartphone) may be provided to ensure that the smartphone was not left somewhere near (or in) the vehicle (e.g., a scenario when the mobile device does not represent the location of the adult). The combination of distance and motion information may be used to determine whether an adult is within a safe distance from the vehicle. If the adult is within the safe distance from the vehicle, then the warning protocol (e.g., alarm or other interventions) may be delayed. For example, unneeded warnings and/or interventions may be eliminated.

The smartphone may be pre-connected to the vehicle (e.g., while the vehicle was on and/or driving) to ensure that the distance tracked corresponds to an occupant (e.g., an adult) of the vehicle. When the vehicle is off, calculations may be performed to determine a distance of the smartphone from the vehicle. The radar device may determine whether a child is present and/or whether an adult has left the vehicle. The motion information may be used to validate that the smartphone was not left in the vehicle with the child. In some embodiments, an application may be installed on the smartphone to enable the communication of the distance and/or motion information. In some embodiments, the distance and/or motion information may be calculated without installing an application on the smartphone.

The combination of the radar information (e.g., to detect the presence of a child in the vehicle), the distance information and/or the motion information (e.g., to determine whether an adult is nearby) may be used to prolong the amount of time before an alarm (or other warning) is performed. In some embodiments, the combination of the radar information, the distance information and/or the motion information may enable the alarm (or other warning system) to be enabled earlier than the prescribed time. For example, if the vehicle owner is determined to walk away from the vehicle (e.g., leaving the child unattended) based on the distance and/or motion information, instead of waiting the prescribed amount of time for generating the alarm, the alarm may be intelligently enabled early.

Referring to FIG. 1, a diagram illustrating a vehicle providing an alert with a child left inside is shown. A scenario 50 is shown illustrating an example context for the present invention. A vehicle 60 is shown in the scenario 50. The vehicle 60 may be turned off (e.g., parked and powered off). In one example, the vehicle 60 may be an electric vehicle (EV). In another example, the vehicle 60 may be a hybrid-electric vehicle. In yet another example, the vehicle 60 may be an internal combustion engine (ICE) vehicle. The type of the vehicle 60 may be varied according to the design criteria of a particular implementation.

An interior 62 of the vehicle 60 is shown. The interior 62 of the vehicle 60 is shown enclosed (e.g., doors are closed and windows are shut). A person 70 is shown within the interior 62. In the example shown, the person 70 may be a child. The person 70 is shown alone within the vehicle 60. The scenario 50 may provide an example of the child 70 left unattended in a parked vehicle (e.g., no adults or other people present in the interior 62).

Multiple lines 80 are shown extending from the vehicle 60. The lines 80 may represent an alert (e.g., an audio alert). The alert 80 may be generated in response to the detection of the child 70 left unattended in the vehicle 60. Generally, the alert 80 may be generated in accordance with regulations that may apply for children being left in vehicles.

Blocks (or circuits) 100a-100n are shown. The circuits 100a-100n may implement radar units. The radar units 100a-100n may be configured to detect the presence of people within the interior 62 of the vehicle 60. The number of radar units 100a-100n implemented by the vehicle 60 may depend on the size of the vehicle 60 and/or potential obstacles within the interior 62. The number of the radar units 100a-100n implemented may be varied according to the design criteria of a particular implementation.

One or more of the radar units 100a-100n may detect the person 70. The radar units 100a-100n may be configured to detect the presence of people in the interior 62 of the vehicle 60 to enable the generation of the alert 80. In some embodiments, the radar units 100a-100n may be configured to detect the person 70 and generate the alert 80 in response to detecting the person 70. In some embodiments, the radar units 100a-100n may be configured to detect the person 70 and provide data about the detection to another component of the vehicle 60 (e.g., an electronic control unit (ECU)) that may generate the alert 80. The combination(s) of components that the radar units 100a-100n may communicate with to enable the generation of the alert 80 may be varied according to the design criteria of a particular implementation.

The radar units 100a-100n may be configured to enable granular control of the generation of the alert 80. For example, the radar units 100a-100n may be configured to suppress the alert 80 unless predetermined criteria are met. In one example, the radar units 100a-100n may prevent and/or disable the alert 80 in response to detection of the person 70 alone. The radar units 100a-100n may be configured to analyze multiple sources of data to ensure the alert 80 is generated in response to scenarios where human intervention and/or attention may be suitable (e.g., potentially dangerous scenarios) without enabling the alert 80 in scenarios that may not need urgent human intervention and/or attention (e.g., may not be dangerous). By analyzing multiple sources of data (e.g., more than presence detection alone), the radar units 100a-100n may be configured to prevent the alert 80 from becoming a nuisance for vehicle owners.

Figure 2:
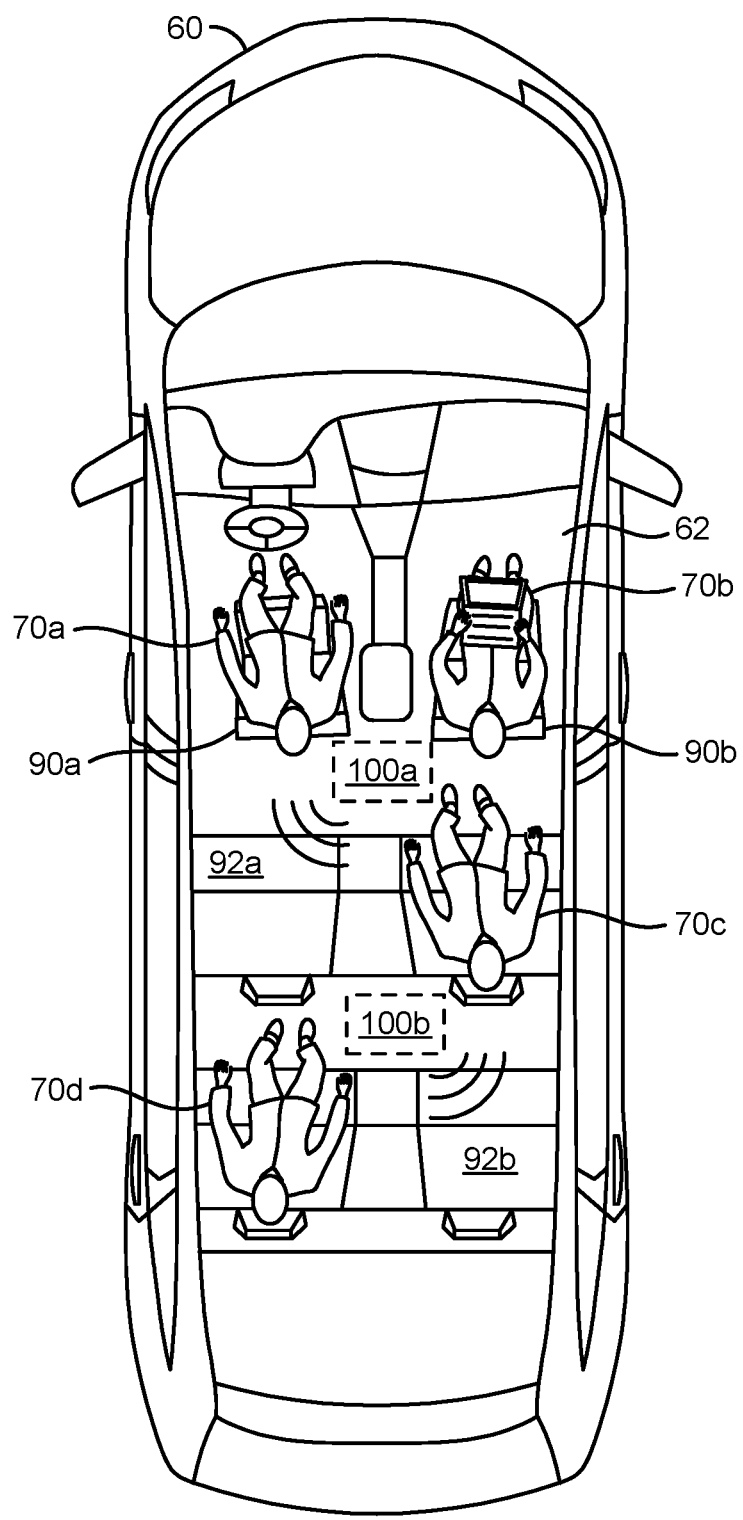
FIG. 2 is a diagram illustrating radar units implemented to detect the presence of people in a vehicle interior.

Referring to FIG. 2, a diagram illustrating radar units implemented to detect the presence of people in a vehicle interior is shown. A top down view of the vehicle 60 is shown. The top down view of the vehicle 60 is illustrated with a top of the vehicle 60 shown as a cutaway to provide a view of the interior 62.

People 70a-70d are shown within the interior 62 of the vehicle 60. The people 70a-70d may represent passengers and/or a driver of the vehicle 60. In the example shown, the people 70a-70d are illustrated as adults. However, the one or more of the people 70a-70d in the vehicle 60 may be any combination of children, teenagers, infants, adults, the elderly, differently-abled people, incapacitated people, etc. In an example, the child 70 shown in association with FIG. 1 may be one of the people 70a-70d. The number and/or characteristics of the people 70a-70d may be varied according to the design criteria of a particular implementation.

Seats 90a-90b are shown in the interior 62. The person 70a is shown in the seat 90a (e.g., a driver in the driver seat 90a). The person 70b is shown in the seat 90b (e.g., a passenger in the front passenger seat 90b). The seats 90a-90b may be a front row of seats of the vehicle 60.

Seat rows 92a-92b are shown. The seat row 92a may be a middle seat row. The person 70c is shown sitting in the middle seat row 92a. The seat row 92b may be a rear seat row. The person 70d is shown sitting in the rear seat row 92b. In the example shown, the vehicle 60 may be illustrated as a vehicle with three rows of seats (e.g., the front row comprising the seats 90a-90b and the seat rows 92a-92b). In the example shown, the seats 90a-90b and the seat rows 92a-92b are shown facing forward (e.g., towards a front end of the vehicle 60). In some embodiments, one or more of the seats 90a-90b and/or individual seats in the seat rows 92a-92b may face forward, backwards, may be rotated at an angle, may be upright, may be reclined, etc. The arrangement of the people 70a-70d in the seats 90a-90b and/or the seat rows 92a-92b, the number of seats, the location of seats and/or the arrangement of seats in the vehicle 60 may be varied according to the design criteria of a particular implementation.

The radar units 100a-100b are shown in the interior 62 of the vehicle 60. The radar units 100a-100b may be configured to detect a presence of the people 70a-70d in the interior 62. The radar units 100a-100b may be configured to operate while the vehicle 60 is turned on (e.g., powered on, driving, idling, etc.). The radar units 100a-100b may be configured to operate while the vehicle 60 is turned off (e.g., powered off, parked, etc.).

In the example shown, the interior 62 of the vehicle 60 may comprise two of the radar units 100a-100b. Generally, the radar units 100a-100b may be installed in the vehicle 60 such that one of the radar units 100a-100n is implemented per every two rows of seats of the vehicle 60. In the example shown, the vehicle 60 may comprise three rows of seats (e.g., the seats 90a-90b and two additional seat rows 92a-92b). In order to accommodate three rows of seats, the two radar units 100a-100n may be implemented. In an embodiment of the vehicle 60 with two rows of seats (e.g., a sedan type vehicle) one of the radar units 100a-100n may be installed. Additional radar units 100a-100n (or fewer of the radar units 100a-100n) may be implemented depending on a layout of the interior 62, the number and/or arrangement of obstacles in the interior 62, different numbers of seat rows, an amount of space in the interior 62, etc. In an example, a mass transit vehicle (e.g., a city bus, a school bus, etc.) may implement five or more of the radar units 100a-100n to ensure people are not left on the mass transit vehicle. The number of radar units 100a-100n implemented and/or the installation location of the radar units 100a-100n may be varied according to the design criteria of a particular implementation.

The radar units 100a-100n may be configured to detect and/or distinguish between the people 70a-70d in the interior 62. The radar units 100a-100n may be configured to determine a number of the people 70a-70d and/or a location of the people 70a-70d in the interior 62. The radar units 100a-100n may be configured to determine characteristics of the people 70a-70d in the interior 62. In the example shown, the radar units 100a-100b may detect the person 70a and the characteristics of the person 70a in the driver seat 90a, the person 70b and the characteristics of the person 70b in the passenger seat 90b, the person 70c and the characteristics of the person 70c in the seat row 92a and the person 70d and the characteristics of the person 70d in the seat row 92b.

The characteristics of the people 70a-70d detected by the radar units 100a-100n may comprise biomarkers, shape and size information and/or other readings about the people 70a-70d. The characteristics may comprise any feature of the people 70a-70d that may be used by the radar units 100a-100n (or other components of the vehicle 60) to infer information about the people 70a-70d detected. In one example, the characteristics of the people 70a-70d detected by the radar units 100a-100n may be used to infer an age range of each of the people 70a-70d. In another example, the characteristics of the people 70a-70d detected by the radar units 100a-100n may be used to infer a status of each of the people 70a-70d (e.g., awake, asleep, in distress, etc.). In yet another example, the characteristics of the people 70a-70d detected by the radar units 100a-100n may be used to infer a body position of each of the people 70a-70d (e.g., sitting upright, leaning against a window, lying down, etc.). The types of characteristics detected and/or the inferences about the people 70a-70d determined in response to the characteristics detected by the radar units 100a-100n may be varied according to the design criteria of a particular implementation.

The radar units 100a-100n may be configured to compare (or provide information for a comparison) of the detected characteristics of the people 70a-70d to known characteristics of particular groups of people. In one example, the characteristics detected by the radar units 100a-100n may be compared against known biometric information about particular categories of people (e.g., biometric information for awake adults, biometric information for sleeping adults, biometric information for awake children, biometric information for sleeping children, etc.).

One of the characteristics detected by the radar units 100a-100n may comprise a body size and/or shape. In an example, a body size and/or shape of the person 70a detected by the radar unit 100a may be compared to known body sizes for particular age groups (e.g., shapes and sizes of male and female adults, shapes and sizes of male and female teenagers, shapes and sizes of male and female children, shapes and sizes for male and female infants, etc.).

One of the characteristics detected by the radar units 100a-100n may comprise a heart beat rate. In an example, a heart beat rate of the person 70c detected by the radar unit 100a may be compared to known heart beat rates for particular age groups (e.g., known heart beat rates for male and female adults, known heart beat rates for male and female children, known heart beat rates for male and female infants, etc.).

One of the characteristics detected by the radar units 100a-100n may comprise a breathing rate. In an example, a breathing rate of the person 70d detected by the radar unit 100b may be compared to known breathing rates for particular age groups (e.g., known breathing rates for male and female adults, known breathing rates for male and female children, known breathing rates for male and female infants, etc.).

One of the characteristics detected by the radar units 100a-100n may comprise a temperature. The temperature measurement may be used to determine a temperature of each of the people 70a-70d and/or an ambient temperature within the vehicle 60. The temperature measured by the radar units 100a-100n may be used to determine whether the people 70a-70d are experiencing extreme temperature conditions (e.g., conditions that may potentially cause harm to the people 70a-70d based on an amount of exposure).

The radar units 100a-100n may provide information about multiple characteristics detected. For example, whether the person 70b is a child or an adult (or a particular age range of the person 70b) may be determined by analyzing the shape of the person 70b and the heart beat rate of the person 70b. In another example, whether the person 70c is a child or an infant (or a particular age range of the person 70c) may be determined by analyzing the shape of the person 70c and the breathing rate of the person 70c.

In the example shown, the passengers 70a-70d may comprise people. Generally, the characteristics of the people 70a-70d detected and/or information inferred about the people 70a-70d may be applicable to human passengers. The radar units 100a-100n may be configured to determine characteristics and/or infer information about other types of living beings (e.g., dogs, cats, etc.). For example, the radar units 100a-100n may be configured to detect the presence and/or categorize pets within the interior 62.

Figure 3:
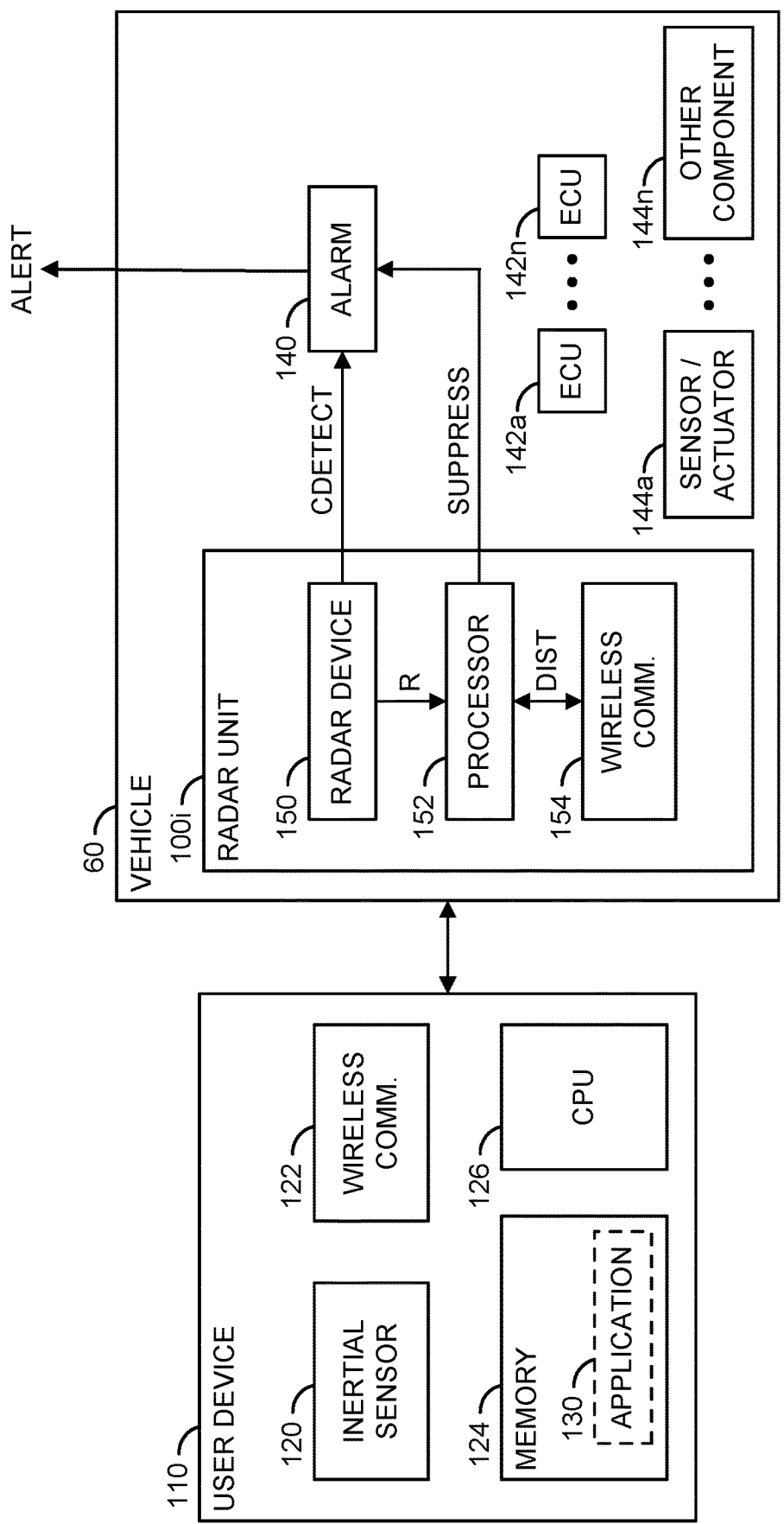
FIG. 3 is a block diagram illustrating an example embodiment of the present invention.

Referring to FIG. 3, a block diagram illustrating an example embodiment of the present invention is shown. The vehicle 60 and a block (or circuit) 110 is shown. The circuit 110 may implement a user device (or communication device or mobile device). The vehicle 60 and the user device 110 may be configured to communicate and/or exchange data wirelessly. In one example, the user device 110 may be a smartphone. In another example, the user device 110 may be a key fob. In yet another example, the user device 110 may be a location tracker and/or fitness tracker. In still another example, the user device 110 may be a tablet computing device. In another example, the user device 110 may be a smartwatch. Generally, the user device 110 may be a portable device configured to perform short range wireless communication. The user device 110 may a self-powered (e.g., battery operated) device that may be carried and/or worn by a person. The type of device implementing the user device 110 may be varied according to the design criteria of a particular implementation.

The user device 110 may comprise a block (or circuit) 120, a block (or circuit) 122, a block (or circuit) 124 and/or a block (or circuit) 126. The circuit 120 may implement inertial sensors. The circuit 122 may implement a wireless communication module. The circuit 124 may implement a memory. The circuit 126 may implement a processor (or CPU). The user device 110 may comprise other components (not shown). The number, type and/or arrangement of the components of the user device 110 may be varied according to the design criteria of a particular implementation.

The inertial sensors 120 may be configured to determine motion information for the user device 110. The inertial sensors 120 may comprise an inertial measurement unit (IMU). The inertial sensors 120 may comprise a linear accelerator, a gyroscope, a gravity sensor, a rotation vector sensor, a significant motion sensor, a step counter sensor, etc. The inertial sensors 120 may be configured to measure an orientation and/or acceleration of the user device 110. The inertial sensors 120 may be configured to measure a direction and/or bearing of the user device 110. Generally, the motion information measured by the inertial sensors 120 may provide data that may determine whether the user device 110 is moving (e.g., even a slight amount of movement). The motion information may be used to determine whether the user device 110 is stationary (e.g., not held by a person). The motion information may be used to determine whether the movement of the user device 110 corresponds with natural movements of a person (e.g., held in a pocket, actively being interacted with by a user, etc.).

The wireless communication module 122 may be configured to enable the user device 110 to communicate wirelessly. The wireless communication module 122 may implement one or more wireless communications protocols (e.g., GNSS, Wi-Fi, Bluetooth, ZigBee, NFC, 3G/4G/LTE/5G, etc.). The wireless communication module 122 may be configured to receive information and transmit information to other devices (e.g., phone calls, internet access, GPS/GNSS coordinates, etc.). The wireless communication module 122 may enable the user device 110 to communicate with one or more components of the vehicle 60. The wireless communications module 122 may comprise short-range wireless communications (e.g., a distance of a few feet or a few meters) to enable the radar units 100a-100n to determine whether the person holding the user device 110 is within a predetermined range from the vehicle 60 (e.g., long-distance communications is not necessarily needed). In one example, the wireless communications module 122 may be configured to receive warnings and/or notifications sent by the vehicle 60 to the user device 110 (e.g., receive a notification that a child has been left alone in the vehicle 60).

The wireless communications module 122 may be configured to transmit data that may be used by the radar units 100a-100n (or other components of the vehicle 60) to calculate a distance of the user device 110 from the vehicle 60 and/or determine the motion information. In some embodiments, the calculation of the distance and/or motion information may be performed by the user device 110 and the distance information and/or the motion information may be communicated by the wireless communications module 122 to the components of the vehicle 60. In some embodiments, raw data may be communicated by the wireless communications module 122 and the components of the vehicle 60 (e.g., the radar units 100a-100n) may calculate the distance information and/or the motion information.

The memory 124 may be configured to provide data storage for the user device 110. The memory 124 may comprise a block (or circuit) 130. The block 130 may implement data storage for an application. The application 130 may be configured to communicate and/or interface with the radar units 100a-100n and/or other components of the vehicle 60. In an example, the application 130 may provide an application programming interface (API) that may facilitate the communication of the data used to calculate the distance information and/or the motion information. In another example, the application 130 may be configured to facilitate connecting the user device 110 with one or more components of the vehicle 60 (e.g., to pre-connect the user device 110 while the vehicle 60 is turned on to enable the components of the vehicle 60 to communicate with the user device 110 after the vehicle 60 is turned off).

The CPU 126 may be configured to execute computer readable instructions. The CPU 126 may implement a system on a chip (SoC). The CPU 126 may enable the user device 110 to perform various functionality. For example, if the user device 110 is implemented as a smartphone, the CPU 126 may enable smartphone functionality (e.g., place phone calls, access the internet, run apps, play games, etc.). The application 130 may comprise the computer readable instructions that may be executed by the CPU 126. The CPU 126 may be configured to calculate the motion information and/or the distance information. The CPU 126 may be configured to enable the communication of data that may be used to calculate the distance information and/or the motion information to the components of the vehicle 60.

The vehicle 60 may comprise the radar units 100a-100n (e.g., the radar unit 100i is shown as a representative example for illustrative purposes), a block (or circuit) 140, blocks (or circuits) 142a-142n and/or blocks (or circuits) 144a-144n. The circuit 140 may implement an alarm. The circuits 142a-142n may implement electronic control units (ECU). The circuits 144a-144n may implement various components. The vehicle 60 may comprise other components (not shown). The number, type and/or arrangement of the components of the vehicle 60 may be varied according to the design criteria of a particular implementation.

One or more of the ECUs 142a-142n and/or one or more of the components 144a-144n may be powered on while the vehicle 60 is turned off. In one example, one or more of the ECUs 142a-142n and/or the components 144a-144n may be configured to provide essential features. Generally, the ECUs 142a-142n and/or the components 144a-144n that may remain powered on may be low power consumption devices (e.g., to prevent excessive battery drain). In an example, the one or more of the ECUs 142a-142n and/or the components 144a-144n that may be powered on while the vehicle 60 is turned off may be security systems (e.g., the alarm 140 may provide alerts as an output and other of the components 144a-144n may be comprise sensors configured to perform proximity detection, entry detection, etc.). In another example, the one or more of the ECUs 142a-142n and/or the components 144a-144n that may be powered on may comprise wireless communication devices (e.g., to receive remote unlock signals, remote car starting, communicate status information, etc.). The one or more of the ECUs 142a-142n and/or the components 144a-144n that may be powered on may operate in a sleep or low-powered state (e.g., a remote rear hatch actuator may not consume power, but may be activated in response to a remote door open signal). Generally, the one or more of the ECUs 142a-142n and/or the components 144a-144n that may be turned on when the vehicle 60 is turned off may correspond to security systems, warning systems, and/or vehicle systems. The types of the ECUs 142a-142n and/or the components 144a-144n and/or the functionality of the ECUs 142a-142n and/or the components 144a-144n may be varied according to the design criteria of a particular implementation.

One or more of the ECUs 142a-142n and/or one or more of the components 144a-144n may be powered off while the vehicle 60 is turned off. Generally, to conserve power, most of the ECUs 142a-142n and/or the components 144a-144n may be powered off. For example, the vehicle 60 may have limited functionality while the vehicle 60 is turned off. In an example, one or more of the ECUs 142a-142n and/or the components 144a-144n that may be powered off may be a lighting system. In another example, one or more of the ECUs 142a-142n and/or the components 144a-144n that may be powered off may be a camera system. In yet another example, one or more of the ECUs 142a-142n and/or the components 144a-144n that may be powered off may be an infotainment system. Generally, the ECUs 142a-142n and/or the components 144a-144n that may be turned off when the vehicle 60 is turned off may correspond to driving systems, driver assistance systems, and/or comfort systems.

The alarm 140 may be configured to generate a signal (e.g., ALERT). The signal ALERT may be the alarm sound 80. The signal ALERT may implement a child detection alarm for the vehicle 60 (e.g., in accordance with various regulations). The alarm 140 may be configured to generate the alarm sound 80 in response to the detection of a child left in the interior 62 after the vehicle 60 has been turned off and/or the doors have been locked. In some embodiments, the alarm 140 may be configured to generate the alarm sound 80 in response to a timer. The timer may count down from a predetermined amount of time after the vehicle 60 has been turned off (e.g., to prevent immediate activation of interventions and/or alerts, which may be one type of mitigation for false positives). For example, if the predetermined amount of time is one minute, when the child 70 is detected in the vehicle 60, the alarm 140 may generate the alarm sound 80 after waiting one minute. The radar units 100a-100n may be configured to delay (e.g., extend the timer for the alarm sound 80) and/or suppress the alarm sound 80 based on the calculated distance and/or motion information of the user device 110 (e.g., an additional layer of protection against false positives, excessive alerts and/or unhelpful alerts).

The ECUs 142a-142n may be configured to manage and/or perform calculations for various systems and/or components of the vehicle 60. The ECUs 142a-142n may be configured to receive input from various sensors, perform calculations, make determinations/decisions (e.g., interpret data) and/or generate signals to activate actuators of the vehicle 60. The ECUs 142a-142n may be configured to control specific functionality of the vehicle 60. In an example, the ECUs 142a-142n may control essential functionality (e.g., engine, braking, power steering control, etc.). In another example, the ECUs 142a-142n may control comfort features (e.g., power windows, seats position, HVAC, infotainment, etc.). In yet another example, the ECUs 142a-142n may control security and access to the vehicle 60 (e.g., door locks, keyless entry, etc.). In still another example, the ECUs 142a-142n may control passive and/or active safety features (e.g., airbags, automatic emergency braking, seatbelt restraints, etc.). The types of features controlled by the ECUs 142a-142n may be varied according to the design criteria of a particular implementation.

The ECUs 142a-142n may comprise a processor and/or a memory. In some embodiments, the ECUs 142a-142n may implement application specific integrated circuits (ASIC) and/or a system on a chip (SoC). Generally, the ECUs 142a-142n may comprise dedicated circuitry that runs software or firmware and requires power and data connections to operate.

The radar unit 100i may comprise a block (or circuit) 150, a block (or circuit) 152 and/or a block (or circuit) 154. The circuit 150 may implement a radar device. The circuit 152 may implement a processor (e.g., a CPU, a SoC, etc.). The circuit 154 may implement a wireless module. The radar unit 100i may comprise other components (not shown). The number, type and/or arrangement of the components of the radar units 100a-100n may be varied according to the design criteria of a particular implementation.

The radar device 150 may be configured to generate and/or read radar signals. The radar device 150 may be configured to interpret the data from the radar signals (e.g., a Doppler effect). The radar device 150 may be configured to detect and/or validate a presence of the people 70a-70d in the interior 62. The radar device 150 may be configured to determine characteristics of the people 70a-70d (e.g., the shape, the size, the heart beat rate, the breathing rate, etc.). The data from the radar device 150 may be used to determine an age range, a status (e.g., conscious or unconscious) and/or a location of the people 70a-70d in the interior 62. The radar device 150 may be configured to provide the radar data (e.g., information about the presence of the people 70a-70d) to the processor 152.

In the example shown, the radar units 100a-100n may implement the radar device 150 to perform the detection and/or verification of the presence of the people 70a-70d and/or determine the characteristics of the people 70a-70d. In some embodiments, alternate types of sensors may be implemented (e.g., instead of the radar device 150 or as complementary sensors to the radar device 150 to provide multiple disparate sources of detection). In one example, the presence and/or detection of characteristics of the people 70a-70d may be measured using ultrasonic sensors. In another example, the presence and/or detection of characteristics of the people 70a-70d may be measured using cameras (e.g., computer vision). The type of measurements used to perform the presence and/or detection of characteristics of the people 70a-70d may be varied according to the design criteria of a particular implementation.

The radar device 150 may be configured to generate a signal (e.g., R) and/or a signal (e.g., CDETECT). The signal R may represent the radar data generated by the radar device 150. The radar device may present the signal R to the processor 152. The signal CDETECT may comprise an indication and/or validation that a child (e.g., a person of the age six or younger) has been detected. In the example shown, the signal CDETECT may be generated by the radar device 150. In another example, the signal CDETECT may be generated by the processor 152 (e.g., the processor 152 may receive the signal R, determine whether the child 70 is present and then present the signal CDETECT in response to the detection of the child 70). In some embodiments, the timer for generating the alarm sound 80 may be started in response to the alarm 140 receiving the signal CDETECT.

In some embodiments, the processor 152 may be a component of each of the radar units 100a-100n. The processor 152 may be configured to determine the age range of the people 70a-70d detected (e.g., the input signal R from the radar device 150). The processor 152 may be configured to calculate and/or read the data received from the user device 110. The processor 152 may be configured to calculate and/or read the distance information and/or the motion information of the user device 110 (or multiple user devices). The processor 152 may be configured to determine a distance of the user device 110 (e.g., as a proxy for the location of an adult that may be attending to the child 70) from the vehicle 60.

The processor 152 may be configured to generate a signal (e.g., SUPPRESS). The signal SUPPRESS may be presented to the alarm 140. In one example, the signal SUPPRESS may be generated to prevent the alarm 140 from generating the alarm sound 80. In another example, the signal SUPPRESS may be generated to extend the length of the timer used by the alarm 140 for generating the alarm sound 80. For example, the timer used by the alarm 140 may have ten seconds remaining and another minute may be added to the timer in response to the signal SUPPRESS.

The processor 152 may be configured to communicate one or more input/output signals. The input/output signals may be communicated between the processor 152 and one or more of the components 144a-144n. In one example, one output signal may be presented to the actuator 144a (e.g., to unlock a door of the vehicle 60, to activate a heating, ventilation and air conditioning (HVAC) system, to roll down a window, etc.) In another example, one input signal may be received from the sensor 144n (e.g., to read a temperature measurement, to determine a status of a door, to receive information from a computer vision system, etc.). The signals to/from the processor 152 may be communicated independently or simultaneously.

The wireless module 154 may enable the radar units 100a-100n to communicate wirelessly. The wireless module 154 may implement one or more wireless communications protocols (e.g., GNSS, Wi-Fi, Bluetooth, ZigBee, NFC, etc.). The wireless module 154 may be configured to receive information from external sources and/or communicate data to the external sources. In one example, the wireless module 154 may be configured to communicate with the user device 110 (e.g., a smartphone). In one example, the wireless module 154 may be configured to determine a distance of the smartphone 110 from the vehicle 60. In another example, the wireless module 154 may be configured to communicate warnings and/or notifications to the smartphone 110 (e.g., send a notification that a child has been left alone in the vehicle 60). The wireless module 154 may be configured to communicate with other devices and/or networks. The types of communication networks and/or devices that the wireless module 154 communicates with may be varied according to the design criteria of a particular implementation.

The wireless module 154 may enable communication with the user device 110. For example, the wireless module 154 of the radar units 100a-100n may be compatible with the communication protocol implemented by the wireless communication module 122 of the user device 110. In some embodiments, the wireless module 154 may enable a direct (e.g., device-to-device) connection with the user device 110. In some embodiments, the wireless module 154 may communicate with a network (e.g., a local area network (LAN), the internet, etc.) that is also connected to the user device 110. In some embodiments, the wireless module 154 and the user device 110 may form a mesh network and/or an ad-hoc network. The method of establishing a connection between the wireless module 154 and the user device 110 may be varied according to the design criteria of a particular implementation.

The wireless module 154 may be configured to establish a connection (e.g., become paired) with the user device 110 while the vehicle 60 is turned on (e.g., while the user device 110 is in the interior 62 with one of the people 70a-70d). After the vehicle 60 is turned off, the wireless module 154 may continue the previously established connection with the user device 110. The established connection between the wireless module 154 and the user device 110 may continue even after one of the people 70a-70d that has the user device 110 leaves the vehicle 60. The established connection may remain active until the user device 110 is out of range of the communication link between the wireless module 154 and the user device 110. In some embodiments, the communication link may be broken when the user device 110 moves beyond a range of communication and then may be automatically re-established once the user device 110 returns within range of the vehicle 60. In some embodiments, one or more of the people 70a-70d may register the user device 110 to the wireless module 154 using the application 130. The application 130 may store registered devices to enable the user device 110 to automatically re-connect with the wireless module 154 (e.g., enable a one-time setup).

The wireless module 154 may be configured to communicate a signal (e.g., DIST). The signal DIST may comprise a data transfer between the processor 152 and the wireless module 154. In one example, the signal DIST may comprise the distance information and/or the motion information calculated and communicated from the user device 110. In another example, the signal DIST may comprise raw data generated by the inertial sensor 120 that may be used by the processor 152 to calculate the motion information and/or the distance information. In another example, the signal DIST may comprise additional data that may be sent to/from a remote device and/or a network (e.g., general data communication). The signal DIST may implement a presence signal (e.g., a signal used by the processor 152 to determine the presence of the people 70a-70d that have left the vehicle 60). The type of data and/or format of the data communicated by the signal DIST may be varied according to the design criteria of a particular implementation.

The radar units 100a-100n may be configured to operate when the vehicle 60 is turned off. In some embodiments, the radar units 100a-100n may be configured to remain on an entire time that the vehicle 60 is powered off. In some embodiments, the radar units 100a-100n may be configured to remain on for a predetermined amount of time after the vehicle 60 is powered off. For example, the wireless module 154 may communicate with the user device 110 continually (or continuously) for a predetermined amount of time after the vehicle 60 is turned off to determine the distance and/or location of the user device 110 with respect to the vehicle 60. In an example, the predetermined amount of time after the vehicle 60 is turned off that the radar units 100a-100n may operate may be a maximum limit for the timer used by the alarm 140 to generate the alarm sound 80 (e.g., the alarm sound 80 may be generated after a maximum limit of time (e.g., 10 minutes, 15 minutes, 20 minutes, etc.) regardless of whether the user device 110 is still nearby the vehicle 60 and moving). Limiting the amount of time that the radar units 100a-100n are activated after the vehicle 60 has been turned off may provide efficient operation and/or prevent unnecessary power consumption (e.g., conserve energy).

Figure 4:
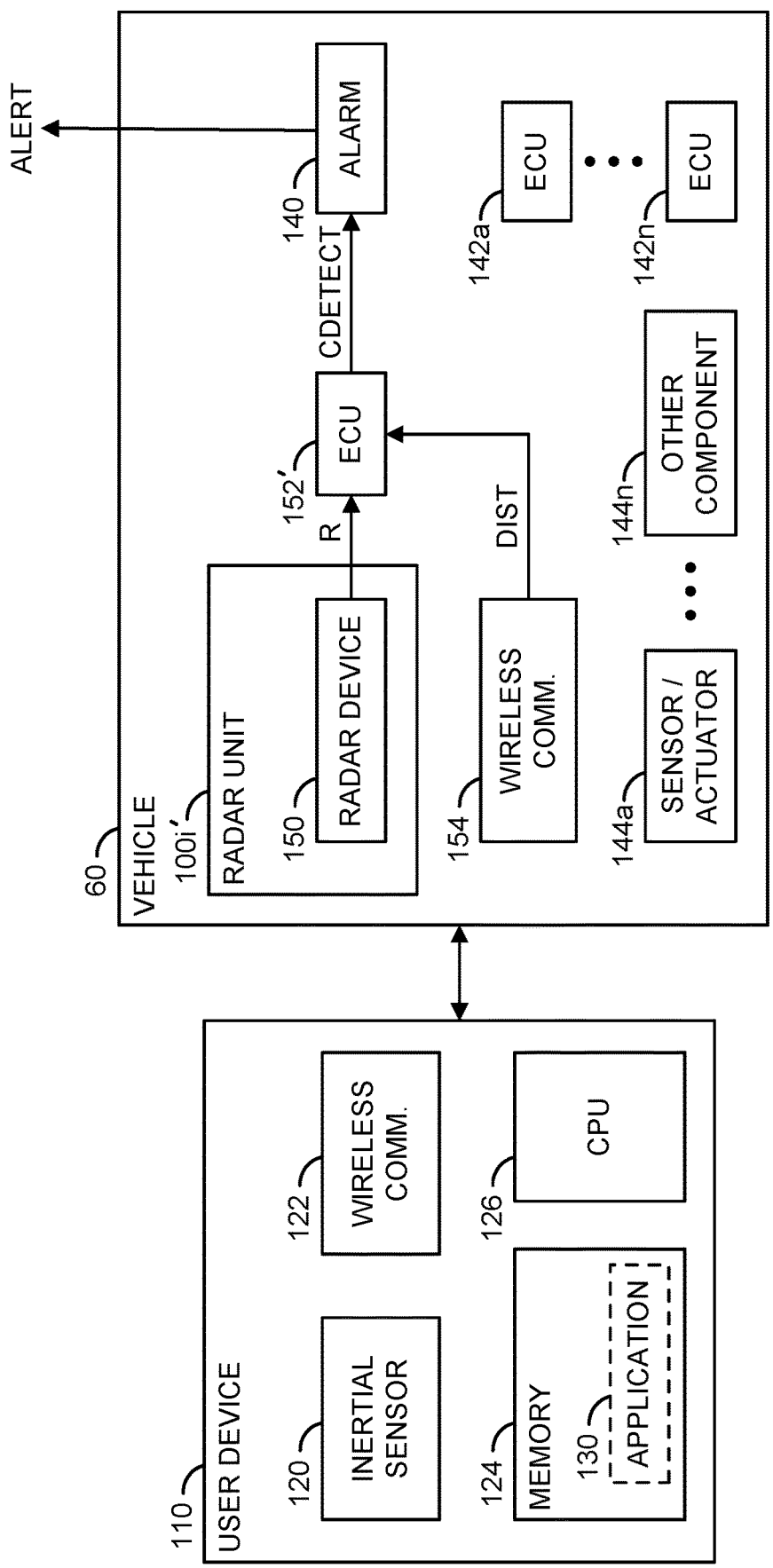
FIG. 4 is a block diagram illustrating an alternate embodiment of the present invention.

Referring to FIG. 4, a block diagram illustrating an alternate embodiment of the present invention is shown. The block diagram of the vehicle 60 may be similar to the block diagram described in association with FIG. 3. The user device 110 and the components 120-126 of the user device 110, the alarm 140, the ECUs 142a-142n and/or the components 144a-144n of the vehicle 60 may have a similar implementation as the functionality described in association with FIG. 3. The radar unit 100i' is shown as a representative example of the radar units 100a'-100n'. The vehicle 60 is shown comprising the ECU 152'.

In some embodiments, the radar units 100a'-100n' may be implemented without the processor 152. In the example shown, the radar unit 100i' may comprise the radar device 150. The wireless module 154 is shown as a device separate from the radar unit 100i'. In some embodiments, the wireless module 154 may be implemented as a component of the radar units 100a'-100n'. The radar device 150 may provide the presence detection information and/or the characteristic information to an external device. The external device may determine the presence and/or validate the presence of the people 70a-70d in the interior 62. The wireless module 154 may present the data for the distance and/or motion information to the external device.

In the example shown, the radar unit 100i' may provide the output signal R to the ECU 152'. The ECU 152' may comprise a processor configured to perform functionality similar to the processor 152 described in association with FIG. 3. The ECU 152' may be configured to receive an input from the radar component 150 (e.g., the signal R) and an input from the wireless module (e.g., the presence signal DIST).

The ECU 152' may be configured to receive input and/or provide output (e.g., the signals CDETECT, the signal SUPPRESS and/or signals presented to/from the components 144a-144n). In some embodiments, the ECU 152' may be configured to activate one or more of the alarm 140 and/or the components 144a-144n in response to only input from one or more of the radar units 100a'-100n' (e.g., the ECU 152' may be a dedicated ECU for the radar units 100a'-100n'). In some embodiments, the ECU 152' may be configured to activate one or more of the alarm 140 and/or the components 144a-144n in response to input from the radar units 100a'-100n' and/or other of the components 144a-144n (e.g., the ECU 152' may be configured to make determinations based on multiple systems within the vehicle 60, similar to the other ECUs 142a-142n).

The ECU 152' may receive the radar data from the radar device 150 and the distance/motion data from the wireless module 154. The ECU 152' may calculate the motion information and/or the distance of the user device 110 from the vehicle 60. In some embodiments, the ECU 152' may present the signal CDETECT to the alarm 140 to activate the alarm sound 80 immediately. In some embodiments, the ECU 152' may present the signal CDETECT to the alarm 140 to start the timer that may be used to enable the alarm sound 80 after the predetermined amount of time has passed. The ECU 152' may be configured to present the signal SUPPRESS to the alarm 140 to prevent the alarm sound 80.

Figure 5:
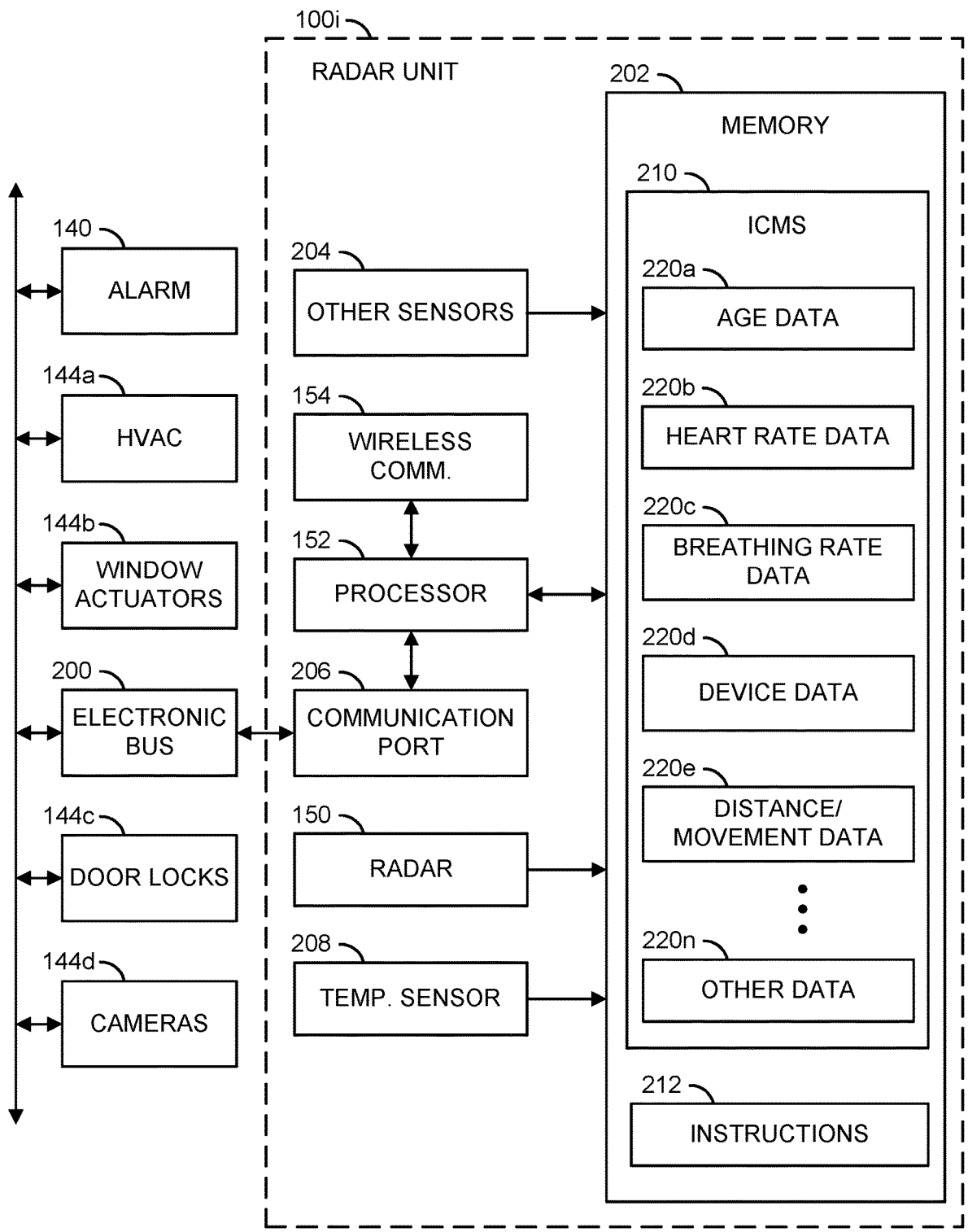
FIG. 5 is a block diagram illustrating components of a vehicle that may determine whether a child is left unattended by an adult.

Referring to FIG. 5, a block diagram illustrating components of a vehicle that may determine whether a child is left unattended by an adult is shown. The radar unit 100i is shown as a representative example of any of the radar units 100a-100n. The radar unit 100i is shown connected to an electronic bus 200.

The electronic bus 200 may be configured to enable various components within the vehicle 60 to exchange data. The electronic bus 200 may be bi-directional to enable the radar units 100a-100n to send and/or receive data to/from other components. In one example, the electronic bus 200 may be a CAN bus.

Various components are shown communicating on the electronic bus 200. In the example shown, the alarm 140, the HVAC 144a, window actuators 144b, door locks 144c, and/or a cameras 144d may communicate over the electronic bus 200. In the example shown, the door locks 144c may be configured to enable the doors of the vehicle 60 to be locked/unlocked and/or report a status of the doors (e.g., open, closed, locked, unlocked, child safety lock engaged, etc.). In the example shown, the cameras 144d may comprise a camera system (e.g., blindspot cameras, cameras used for autonomous driving, etc.). The components communicating over the electronic bus 200 may comprise components and/or ECUs that may be powered off when the vehicle 60 is turned off and/or components and/or ECUs that may be powered on when the vehicle 60 is turned off. For example, the electronic bus 200 may enable the radar units 100a-100n to activate (e.g., wake up from a power conserving off state or a low-powered state) one or more components and/or ECUs that have been turned off.

The radar unit 100i is shown comprising the radar device 150, the processor 152, the wireless module 154, a block (or circuit) 202, a block (or circuit) 204, a block (or circuit) 206 and/or a block (or circuit) 208. The circuit 202 may implement a memory. The circuit 204 may implement other sensors. The circuit 206 may implement a communication port. The circuit 208 may implement a temperature sensor. The radar units 100a-100n may comprise other components (not shown). The number, type and/or arrangement of the components of the radar units 100a-100n may be varied according to the design criteria of a particular implementation.

The memory 202 may comprise a block (or circuit) 210 and/or a block (or circuit) 212. The circuit 210 may comprise ICMS storage. The circuit 212 may comprise computer readable instructions. The memory 202 may be configured to store data presented by the radar device 150, the processor 152, the wireless module 154, the other sensors 204 and/or the temperature sensor 208. The memory 202 may be configured to provide stored data and/or the computer readable instructions to the processor 152.

The radar units 100a-100n may be configured to generate presence information (e.g., from the radar device 150), ambient temperature measurements (e.g., from the ambient temperature sensor 208) and/or distance and/or motion information received from the wireless module 154. The radar units 100a-100n may implement other sensors 204. The other sensors 204 may be configured to perform other types of measurements that may be relevant to determining the conditions within the interior 62 and/or the presence of the people 70a-70d (e.g., camera data, pressure, humidity, ultrasonic data, etc.).

The communication port 206 may comprise a wired connection. The communication port 206 may be configured to enable communication via the electronic bus 200. The communication port 206 may enable the processor 152 to send/receive data over the electronic bus 200 to communicate with the alarm 140, the ECUs 142a-142n and/or the components 144a-144n. In some embodiments, the communication port 206 may enable the processor 152 to activate one or more of the disabled (or powered down) ECUs 142a-142n and/or the devices 144a-144n.

The temperature sensor 208 may implement an ambient temperature sensor. The temperature sensor 208 may be configured to provide an independent temperature sensor configured to measure the temperature of the interior 62 and/or detect the temperature(s) of the people 70a-70d. The temperature sensor 208 may be operational even when the HVAC 144a has been powered off.

The ICMS storage 210 may be configured to store data for the ICMS features. The ICMS storage 210 may comprise blocks (or circuits) 220a-220n. The blocks 220a-220n may store various data sets. For example, the data sets 220a-220n may comprise age data 220a, heart rate data 220b, breathing rate data 220c, device data 220d, distance/movement data 220e and/or other data 220n.

The processor 152 may be configured to execute stored computer readable instructions (e.g., the instructions 212 stored in the memory 202). The processor 152 may perform one or more steps based on the stored instructions 212. In an example, one of the steps of the instructions 212 executed/performed by the processor 152 may analyze the characteristics of the detected people 70a-70d and read information received by the wireless module 154. In another example, one of the steps of the instructions 212 executed/performed by the processor 152 may determine an age range of the people 70a-70d. In yet another example, one of the steps of the instructions 212 executed/performed by the processor 152 may determine a distance of the user device 110 from the vehicle 60 in response to the presence signal DIST. In still another example, one of the steps of the instructions 212 executed/performed by the processor 152 may suppress the alarm 140 (or other intervention) in response to the distance of the user device 110 being within a predetermined range of the vehicle 60 and detecting that the user device 110 is moving. The instructions executed and/or the order of the instructions 212 performed by the processor 152 may be varied according to the design criteria of a particular implementation.

The age data 220a may comprise information about characteristics that may be commonly associated with various age groups. The age data 220a may be used by the processor 152 to compare against the characteristics measured by the radar device 150. In an example, the age data 220a may comprise biometric information about breathing rates and/or heart rates that may be associated with particular types of people (e.g., age ranges, genders, body type, body size, etc.). The age data 220a may comprise statistical information about different types of people. The age data 220a may enable the processor 152 to compare against the characteristics to determine whether any of the detected people 70a-70d are infants, children, teenagers, adults, elderly, over a particular age, below a particular age, in between limits of an age range, etc. The granularity of the various age ranges may be varied according to the amount of statistical information available.

The heart rate data 220b may comprise information about the heart rates of the detected people 70a-70d. The heart rate data 220b may be provided by the radar device 150. In an example, the heart rate data 220b may be stored about each of the detected people 70a-70d. In some embodiments, the heart rate data 220b may be stored according to a time of measurement to enable the heart rates detected to be monitored over time (e.g., to determine potential issues with rapidly increasing heart rates or decreasing rates). The heart rate data 220b may be used by the processor 152 to compare against the age data 220a (e.g., known heart beat rates) in order to determine the age range and/or other characteristics of the people 70a-70d.

The breathing rate data 220c may comprise information about the breathing rates of the detected people 70a-70d. The breathing rate data 220c may be provided by the radar device 150. In an example, the breathing rate data 220c may be stored about each of the detected people 70a-70d. In some embodiments, the breathing rate data 220c may be stored according to a time of measurement to enable the breathing rates detected to be monitored over time (e.g., to determine potential issues if a person stops breathing, has shallow breaths, is hyperventilating, etc.). The breathing rate data 220c may be used by the processor 152 to compare against the age data 220a (e.g., known breathing rates) in order to determine the age range and/or other characteristics of the people 70a-70d.

The device data 220d may comprise information about the user device 110 and/or other devices connected to the wireless module 154. The people 70a-70d may connect to the wireless module 154 while the vehicle 60 is powered on to establish a connection between the user device 110 and the radar modules 100a-100n. For example, the application 130 may be used to register the user device 110. Information about the user device 110 may be stored in the device data 220d (e.g., a MAC address, an IMEI number, a SIM card ID, a device name, a user name, etc.). The device data 220d may enable the wireless module 154 to remember the user device 110 to enable the user device 110 to automatically connect to the wireless module 154 each time the user device 110 is brought into or near the vehicle 60. The device data 220d may enable the processor 152 to distinguish between distance and/or motion information from multiple devices that may be connected to the wireless module 154. The device data 220d may enable the processor 152 to determine which devices were within the vehicle 60 before the vehicle 60 was turned off and which devices are no longer inside the vehicle 60. Generally, the wireless module 154 may calculate the distance information and/or the motion information for devices that have previously established a connection (e.g., connected while the vehicle 60 was powered on and stored as the device data 220d) to ensure that only mobile devices that were within the interior 62 are tracked (e.g., mobile devices of random pedestrians are not tracked).

The distance/movement data 220e may comprise information about the user device 110. In one example, the user device 110 may communicate calculated distance information and/or motion information (e.g., calculated by the inertial sensors 120) to the wireless module 154, which may be stored as the distance/movement data 220e. In another example, the user device 110 may communicate raw data that may be received by the wireless module 154 and used by the processor 152 to calculate the distance information and/or the motion information, which may be stored as the distance/movement data 220e. The distance/movement data 220e may store the predetermined distance and/or range from the vehicle 60 that may be compared with the distance information from the user device 110 to determine whether the child 70 has been left unattended. For example, the processor 152 may compare the received and/or calculated distance information to the predetermined range to determine whether one of the people 70a-70d that has left the interior 62 has moved too far away from the vehicle 60 (e.g., the person is no longer attending to the child 70). The distance/movement data 220e may be stored for multiple devices simultaneously to enable the monitoring of the distance/movement of multiple devices.

The other data 220n may comprise other data that may be relevant to determining the characteristics of the people detected 70a-70d, determining whether the user device 110 is too far from the vehicle 60, determining whether the user device 110 is moving or has been left in the vehicle 60 and/or determining for how long to suppress the alarm 140. In one example, the other data 220n may comprise shape and/or size information detected about people 70a-70d by the radar device 150. In another example, the other data 220n may comprise statistical shape and/or size information about various age groups, people and/or animals that may be used by the processor 152 to compare against the detected people 70a-70d. The types of data stored by the other data 220n may be varied according to the design criteria of a particular implementation.

Figure 6:
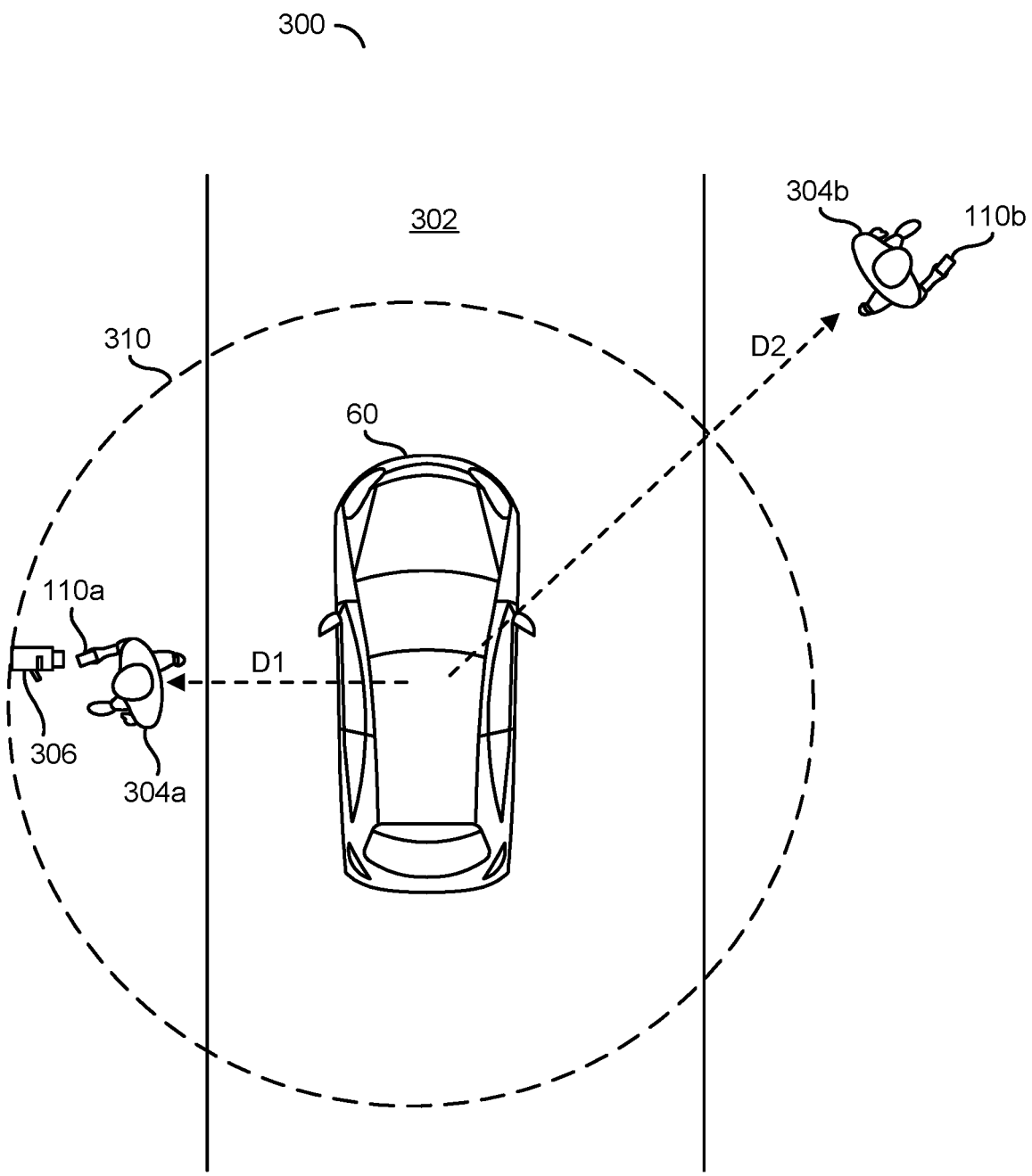
FIG. 6 is a diagram illustrating tracking a distance of adults from a vehicle.

Referring to FIG. 6, a diagram illustrating tracking a distance of adults from a vehicle is shown. A view 300 is shown. The view 300 may comprise a top-down view of the vehicle 60. The vehicle 60 is shown parked on a road (or driveway) 302. In the view 300, the vehicle 60 may be turned off (or powered off) with the doors closed (or locked). The child 70 (not shown) may be left in the interior 62 of the vehicle 60.

A person 304a and a person 304b are shown. The people 304a-304b may be adults (e.g., a driver of the vehicle 60, an owner of the vehicle 60, an adult that may be in charge of the child 70, etc.). The people 304a-304b may have previously been one of the people 70a-70d within the interior 62. The people 304a-304b may have left the child 70 inside the vehicle 60 and exited the vehicle 60.

The person 304a is shown carrying the user device 110a. The person 304b is shown carrying the user device 110b. The user devices 110a-110b are each shown as smartphones held in a hand of a respective one of the users 304a-304b for illustrative purposes. However, the user devices 110a-110n may be a worn device (e.g., a smart watch, smart glasses, smart clothing, a fitness tracker, etc.), stored in a pocket, clipped to a belt, etc. Each of the user devices 110a-110b may have previously established a connection with the wireless module 154 (e.g., stored as the device data 220d). The processor 152 may use the user devices 110a-110b as a proxy for the location of the respective people 304a-304b with respect to the vehicle 60. For example, the processor 152 and/or the radar units 100a-100n may not be directly aware of the people 304a-304b (e.g., the location and/or distance of the people 304a-304b may be inferred by the distance information and/or location information of the user devices 110a-110b).

A mailbox 306 is shown. The person 304a is shown next to the mailbox 306. For example, the person 304a may have parked the vehicle 60, exited the vehicle 60 without removing the child 70. The person 304a may be aware that the child 70 has been left in the vehicle 60 but intended to perform a quick errand (e.g., checking for mail in the mailbox 306) before removing the child 70 from the vehicle 60. A quick errand near the vehicle 60 may be one example scenario where the alarm sound 80 may be unnecessary and/or a nuisance.

A dotted circle 310 is shown. The dotted circle 310 may illustrate a range around the vehicle 60. The range 310 may represent the predetermined distance from the vehicle 60 used to determine whether to suppress the alarm sound 80. For example, when at least one of the user devices 110a-110b are within the range 310, the alarm sound 80 may be suppressed and if all of the user devices 110a-110b are outside of the range 310, then the alarm sound 80 may be enabled. The processor 152 may consider the people 304a-304b (e.g., based on the location of the user devices 110a-110b) that are outside of the range 310 to be too far away from the vehicle 60 to be attending to (or aware of) the child 70. The processor 152 may consider the people 304a-304b within the range 310 to be nearby the vehicle 60.

The range 310 may extend in all directions around the vehicle 60. In the example shown, the range 310 may have a circular shape. However, the range 310 may have any type of shape. For example, the range 310 may have an irregular shape defined by the communication distance of the wireless module 154 and/or the wireless communication module 122. In one example, the range 310 may be a distance of approximately ten feet. In another example, the range 310 may be a distance of approximately ten meters. The range 310 may be a configurable value. For example, the range 310 may be selected by design and/or by experience (e.g., based on statistical information about how far away people go from the vehicle 60 when they forget about a child left in the vehicle). The area of coverage and/or the shape of the range 310 may be varied according to the design criteria of a particular implementation.

A distance (e.g., D1) is shown between the vehicle 60 and the person 304a. A distance (e.g., D2) is shown between the vehicle 60 and the person 304b. The distances D1-D2 may represent a distance calculated by the processor 152 based on the data communicated between the user device 110a-110b and the wireless module 154. The processor 152 may determine a straight line distance from the vehicle 60 (e.g., one of the radar units 100a-100n) to each of the user devices 110a-110b to determine the distance information D1-D2. The processor 152 may further determine the motion information about each of the user devices 110a-110b. The distance information D1-D2 and the motion information may be stored as the distance/movement data 220e.

The distance D1 is shown within the range 310. The processor 152 may determine that the person 304a is nearby the vehicle 60 (e.g., close enough to be considered not needing to be reminded about the child 70 left in the vehicle 60). For example, based on the distance D1 of the user device 110a (and the motion information indicating movement of the user device 110a) alone the processor 152 may suppress the alarm sound 80 (e.g., generate the signal SUPPRESS).

The distance D2 is shown outside of the range 310. The processor 152 may determine that the person 304b is far away from the vehicle 60 (e.g., far enough to be considered not to be aware of the child 70 left in the vehicle 60). For example, based on the distance D2 of the user device 110b (and the motion information indicating movement of the user device 110b) alone the processor 152 may not suppress the alarm sound 80. In an example, the person 304b may have left the vehicle 60 to enter a store and either forgot about the child 70 or may be unaware of the potential danger of leaving the child 70 inside the vehicle 60. Generating the alarm sound 80 may be appropriate (or needed) to alert the person 304b (or other people nearby) to the child 70 locked within the vehicle 60.

In an example scenario, the vehicle 60 may be occupied by the people 70a-70c (e.g., the person 304a, the person 304b and the child 70, respectively). While driving, the radar device 150 may determine the presence of the people 70a-70c and/or the characteristics of the people 70a-70c (e.g., the person 70a/304a may be an adult, the person 70b/304b may be an adult and the person 70c may be the child 70 based on shape, breathing rate, heart rate, etc.). While the vehicle 60 is powered on, the user devices 110a-110b may be connected to the wireless module 154. The vehicle 60 may then be parked in the driveway 302 and turned off. The person 304a may exit the vehicle 60 and close the door to check the mailbox 306. The person 304b may exit the vehicle 60 to return to home.

Continuing the scenario, the radar device 150 may detect that the child 70 is still within the vehicle 60 while the vehicle 60 is turned off and that no other adult occupants are within the vehicle 60. The wireless module 154 may communicate with the user devices 110a-110b to determine the distance information D1-D2. The wireless module 154 may further communicate with the user devices 110a-110b to determine the movement information about the user devices 110a-110b. For example, the movement information may indicate that both the user devices 110a-110b are moving (e.g., the processor 152 may determine that the user devices 110a-110b have not been left in the vehicle 60). The processor 152 may determine that the person 304b is outside of the range 310. The processor 152 may determine that the person 304a is within the range 310. Since the person 304a is within the range 310, the processor 152 may suppress the alarm sound 80.

Continuing the scenario, the processor 152 may continually (or periodically) re-calculate the distance information D1-D2. If the person 304a leaves the range 310, then the processor 152 may determine that the child 70 has been left unattended and may enable the alarm sound 80 (or allow the timer to count down). If the person 304a leaves the range 310, but the user device 110b re-establishes connection within the range 310, the processor 152 may determine that the child 70 has not been left unattended (e.g., the person 304b may have returned to attend to the child 70) and the processor 152 may suppress the alarm sound 80. If the person 304a removes the child 70 from the vehicle 60, the radar device 150 may no longer detect the presence of the child 70 within the interior 62 and the processor 152 may disable the alarm 140 (e.g., child presence detection may no longer be needed with no child left in the vehicle 60). If no more children are left within the vehicle 60, the radar units 100a-100n may be powered down and/or enter a low power mode in order to conserve power of the vehicle 60.

While the description of suppressing and/or enabling the alarm sound 80 has been described in association with the child 70 left in the vehicle 60, the radar units 100a-100n may be configured to perform similar functionality for other types of people. For example, the heart beat rate, the breathing rate and/or the shapes may be detected by the radar device 150 to detect the elderly, the differently-abled, pets and/or other types of people left unattended in the vehicle 60.

Generally, the alarm 140 may generate the alert sound 80 when the child 70 is determined to be left unattended. In some embodiments, other interventions may be performed. In an example, the door locks 144c may cause the doors of the vehicle 60 to unlock in response to the unattended child. In yet another example, the HVAC system 144a may be activated in response to the unattended child. In still another example, the wireless module 154 may communicate a notification (e.g., a text message, a push notification to the application 130, a phone call, etc.) to the user devices 110a-110b in response to the unattended child. Similar to the suppression of the alarm sound 80, the processor 152 may suppress the other types of interventions when at least one of the people 304a-304b are within the range 310 and movement has been detected. In another example, in response to determining that the child 70 has been left in the vehicle 60 but at least one of the people 304a-304b is moving within the range 310, the processor 152 may activate a less intrusive intervention instead of the alert sound 80 (e.g., providing a notification using the wireless module 154 may be less intrusive than activating the alarm 140).

Figure 7:
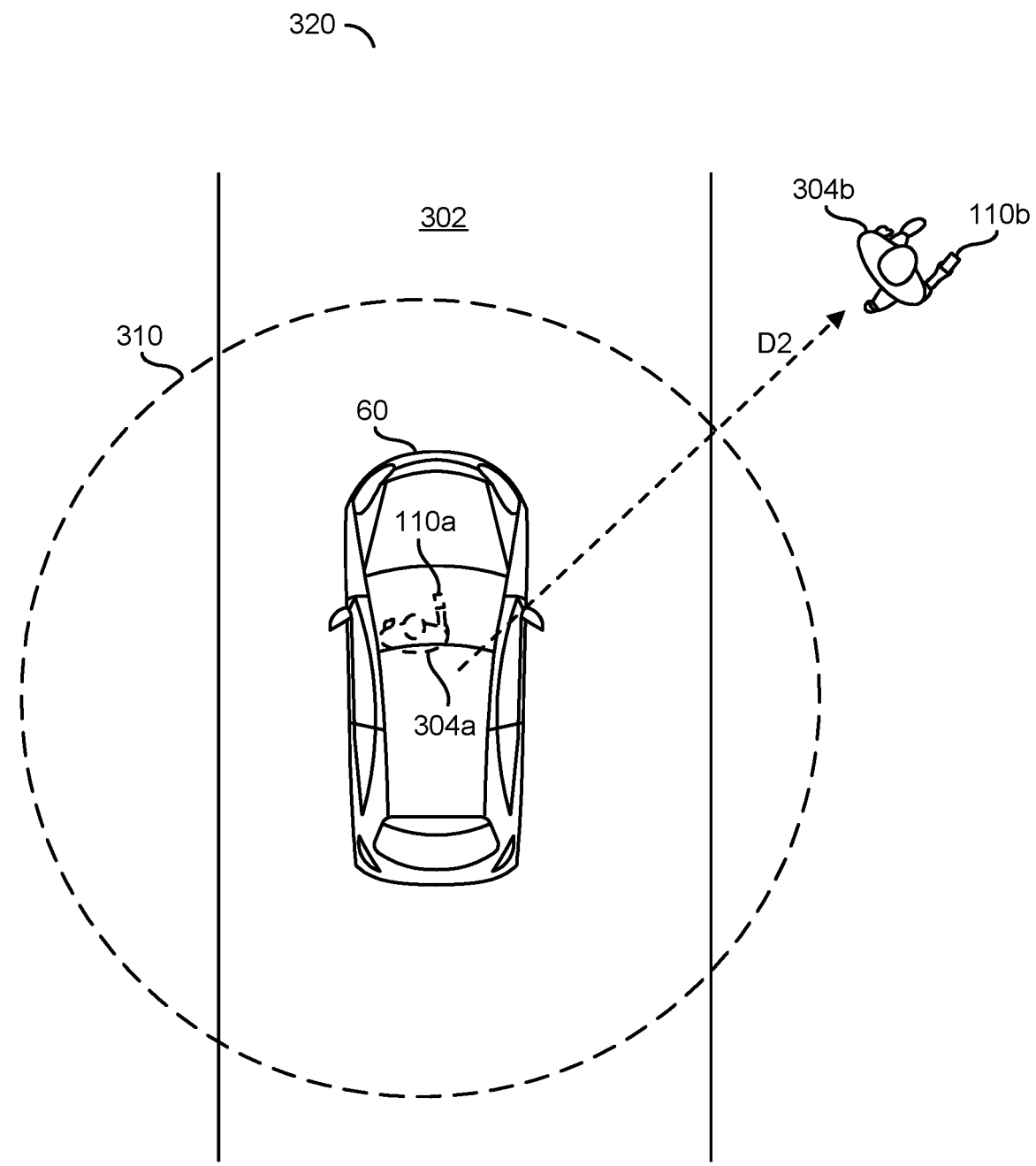
FIG. 7 is a diagram illustrating detecting an adult in a vehicle.

Referring to FIG. 7, a diagram illustrating detecting an adult in a vehicle is shown. A view 320 is shown. The view 320 may comprise a top-down view of the vehicle 60 similar to the example view shown in association with FIG. 6. The vehicle 60 is shown parked on the road 302 and the range 310 is shown. In the view 320, the vehicle 60 may be turned off (or powered off) with the doors closed (or locked). The child 70 (not shown) may be left in the interior 62 of the vehicle 60. Similar to the example shown in association with FIG. 6, the person 304b is shown the distance D2 away from the vehicle 60 (e.g., based on the distance information of the user device 110b) and outside of the range 310.

The person 304a is shown within the vehicle 60. The user device 110a is shown with the person 304a. When the vehicle 60 is turned off, the radar device 150 may determine the presence of any of the people 70a-70d within the vehicle 60. The processor 152 may determine that the child 70 is left in the vehicle 60. The processor 152 may determine that the adult person 304a is also within the vehicle 60. Since the adult person 304a is in the vehicle 60, the processor 152 may suppress the alarm sound 80 (e.g., regardless of the distance information D2 indicating that the person 304b is outside of the range 310). For example, the adult person 304a may be capable of attending to the child 70 (and potentially removing the child 70 from the vehicle 60 if the interior 62 becomes too hot or too cold). In some embodiments, to conserve power, the wireless module 154 may not communicate with the user devices 110a-110n (e.g., the processor 152 may not perform the distance calculations and/or determine the motion information) while the adult person 304a is within the vehicle 60 with the child 70.

In some embodiments, the radar device 150 may continuously (or continually) measure for the presence of the people 70a-70d while the vehicle 60 is turned off to ensure that at least one adult is within the vehicle 60 with the child 70. In some embodiments, the radar device 150 may periodically measure the presence of the people 70a-70d while the vehicle 60 is turned off to ensure at least one adult is within the vehicle 60 with the child 70. For example, the radar device 150 may be active (e.g., powered on and performing measurements) for an activation amount of time after the vehicle 60 has been turned off. After the activation amount of time has passed, the radar device 150 may be turned off (or enter a low powered or sleep state) and the measurements may be stopped. The radar device 150 may operate in the low powered state for an interval amount of time. After the interval amount of time has passed (e.g., five minutes), the radar device 150 may return to the powered on state to perform a periodic measurement (e.g., to determine that the adult person 304a is still within the vehicle 60 with the child 70, to determine whether the child 70 is still in the vehicle 60, etc.). After the periodic measurement (e.g., a measurement amount of time has passed), the radar device 150 may return to the low powered state. The radar device 150 may cycle between the powered on state and the low powered state for a predetermined amount of time. The activation amount of time, the interval amount of time, the measurement amount of time and/or the predetermined amount of time may be the same amounts of time or different amounts of time. The length of time for each of the activation amount of time, the interval amount of time, the measurement amount of time and/or the predetermined amount of time may be varied according to the design criteria of a particular implementation.

In an example scenario where the user device 110a is left in the vehicle but the adult person 304a is not in the vehicle 60, the processor 152 may determine whether to suppress the alarm sound 80 based on the distance information and/or the motion information. For example, the radar device 150 may measure information that the processor 152 may use to determine that the child 70 is left alone in the vehicle 60. The wireless module 154 may receive the information used to determine the distance information D1-D2 and/or the motion information. Since the user device 110a is within the vehicle 60, the user device 110 may be within the range 310. The distance information D2 may indicate that the user device 110b is outside of the range 310. Based on the distance information alone, the processor 152 may determine that an adult is nearby the vehicle 60. However, the processor 152 may also detect the motion information. Since the user device 110a has been left in the vehicle 60, no movement of the user device 110a may be detected. Since the user device 110a does not provide movement information, the processor 152 may determine that the adult person 304a is not near the vehicle 60. Since neither of the people 304a-304b are within the range 310, the processor 152 may enable the alarm sound 80.

Figure 8:
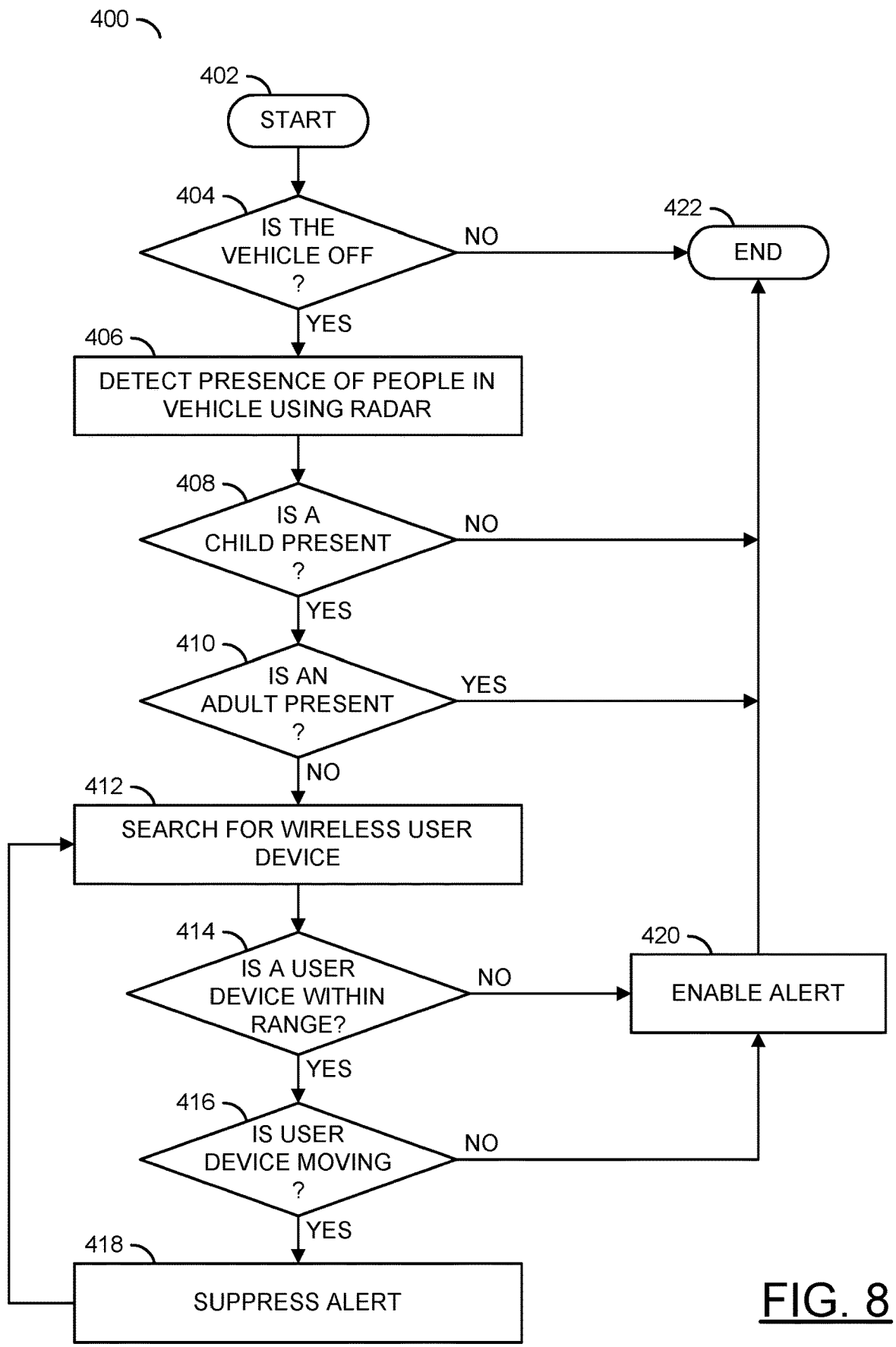
FIG. 8 is a flow diagram illustrating a method for providing a child presence detection warning suppression.

Referring to FIG. 8, a method (or process) 400 is shown. The method 400 may provide a child presence detection warning suppression. The method 400 generally comprises a step (or state) 402, a decision step (or state) 404, a step (or state) 406, a decision step (or state) 408, a decision step (or state) 410, a step (or state) 412, a decision step (or state) 414, a decision step (or state) 416, a step (or state) 418, a step (or state) 420, and a step (or state) 422.

The step 402 may start the method 400. Next, the method 400 may move to the decision step 404. In the decision step 404, the processor 152 (or the ECU 152') may determine whether the vehicle 60 is turned off. In an example, the processor 152 may be configured to read an operating status of the vehicle 60 from the electronic bus 200. If the vehicle 60 is on, then the method 400 may move to the step 422. If the vehicle 60 is off, then the method 400 may move to the step 406. In the step 406, the radar device 150 may perform measurements to enable the processor 152 to detect the presence of the people 70a-70d in the vehicle 60. Next, the method 400 may move to the decision step 408.

In the decision step 408, the processor 152 (or the ECU 152') may determine whether a child is present in the interior 62 of the vehicle 60. For example, the radar device 150 may perform measurements and the processor 152 may analyze the heart beat rate, the breathing rate and/or the shape of the people 70a-70d to determine whether the characteristics detected correspond to the characteristics of the age range of a child (or an infant). If a child is not present, then the method 400 may move to the step 422. If a child is present, then the method 400 may move to the decision step 410.

In the decision step 410, the processor 152 (or the ECU 152') may determine whether an adult is present in the interior 62 of the vehicle 60. Similar to detecting whether a child is present, the processor 152 may analyze the heart beat rate, the breathing rate, and/or the shape of the people 70a-70d to determine whether the characteristics detected correspond to the characteristics of the age range of an adult (e.g., a person that may be capable of attending to the child). While the method 400 is shown determining the presence of the child 70 in the decision step 408 and the adult in the decision step 410 sequentially, the analysis of the characteristics of the people 70a-70d and/or any determinations made about the age range of the people 70a-70d may be performed by the processor 152 in parallel. If an adult is present, then the method 400 may move to the step 422. If no adult is present, then the method 400 may move to the step 412.

In the step 412, the wireless module 154 may search for any of the user devices 110a-110n. For example, the wireless module 154 may have established connections with the user devices 110a-110n while the vehicle 60 was turned on. The wireless module 154 may receive the distance information and/or the motion information and present the information to the processor 152. Next, the method 400 may move to the decision step 414.

In the decision step 414, the processor 152 may determine whether at least one of the user devices 110a-110n is within the range 310. For example, the processor 152 may analyze the distance information DIST received from the wireless module 154 to determine the distance of the user devices 110a-110n from the vehicle 60 and compare the calculated distances with the predetermined range 310. If the user devices 110a-110n are not within the range 310, then the method 400 may move to the step 420 (e.g., to enable the alert sound 80). If at least one of the user devices 110a-110n are within the range 310, then the method 400 may move to the decision step 416.

In the decision step 416, the processor 152 may determine whether the user devices 110a-110n that are within the range 310 are moving. For example, the processor 152 may analyze the motion information received by the wireless module 154 to determine whether the user devices 110a-110n are moving or are motionless. If at least one of the user devices 110a-110n within the range 310 is moving, then the method 400 may move to the step 418. In the step 418, the processor 152 may suppress the alert sound 80. For example, the processor 152 may present the signal SUPPRESS to the alarm 140 to prevent the alert sound 80. Next, the method 400 may return to the step 412. In the decision step 416, if none of the user devices 110a-110n within the range 310 is moving, then the method 400 may move to the step 420. In the step 420, the processor 152 may enable the alarm 140 to generate the alert sound 80. Next, the method 400 may move to the step 422. The step 422 may end the method 400.

Figure 9:
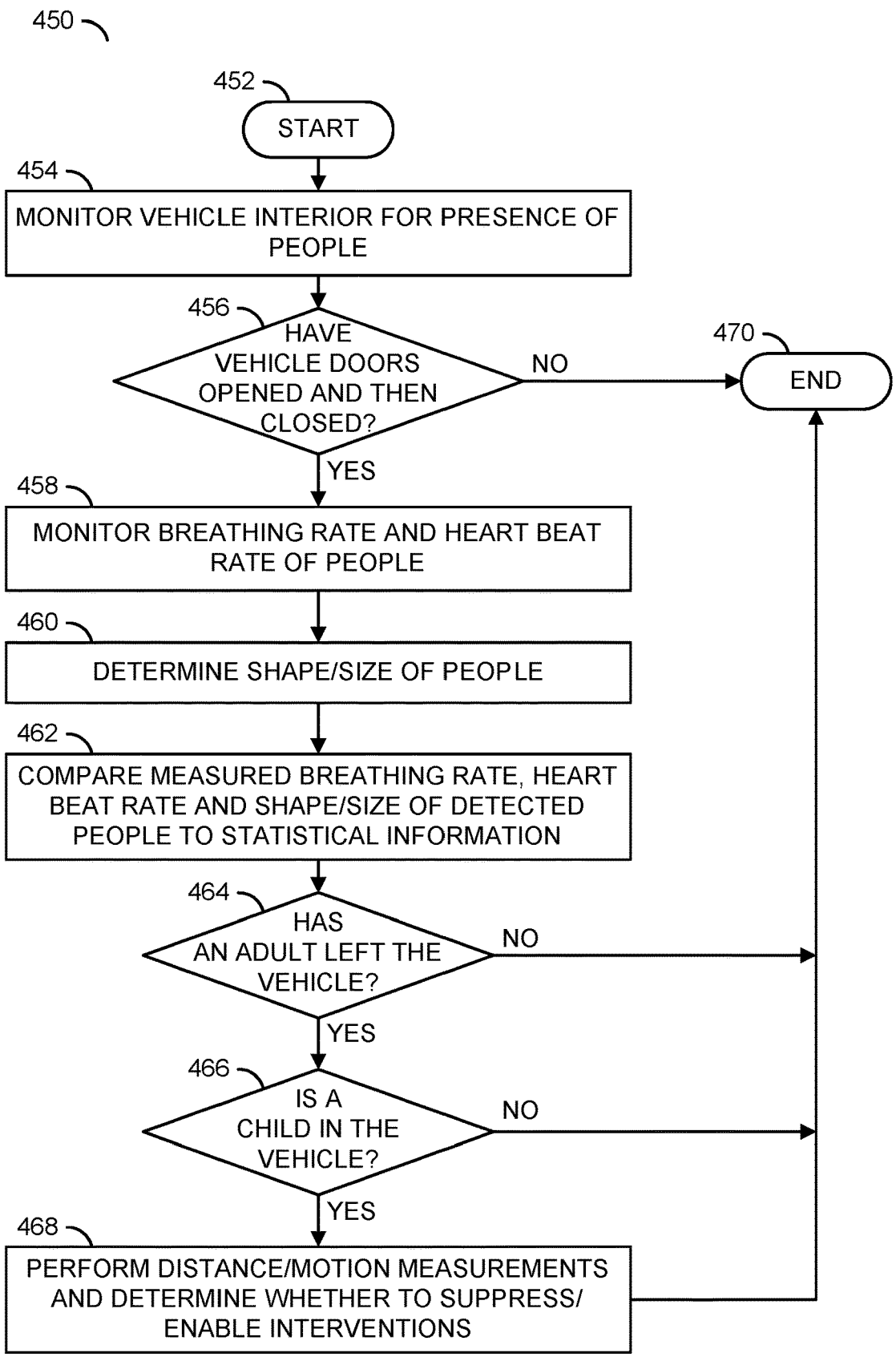
FIG. 9 is a flow diagram illustrating a method for detecting a child based on characteristics measured by a radar device.

Referring to FIG. 9, a method (or process) 450 is shown. The method 450 may detect a child based on characteristics measured by a radar device. The method 450 generally comprises a step (or state) 452, a step (or state) 454, a decision step (or state) 456, a step (or state) 458, a step (or state) 460, a step (or state) 462, a decision step (or state) 464, a decision step (or state) 466, a step (or state) 468, and a step (or state) 470.

The step 452 may start the method 450. In the step 454, the radar device 150 may perform measurements to enable the processor 152 to monitor the interior 62 of the vehicle 60 for the presence of the people 70a-70d. Next, the method 450 may move to the decision step 456.

In the decision step 456, the processor 152 may determine whether the vehicle doors have been opened and then closed. For example, the processor 152 may read a status of the doors and/or door locks from the electronic bus 200. The opening of the doors and the closing of the doors may indicate that one or more of the people 70a-70d has left the vehicle 60. Even if the vehicle 60 has been left on, the child 70 may be left unattended (e.g., a parent leaves the vehicle idling while running an errand may leave the child 70 behind and forget about the child 70). If the doors of the vehicle 60 have not opened and then closed, then the method 450 may move to the step 470. If the doors of the vehicle 60 have opened and then closed, then the method 450 may move to the step 458.

In the step 458, the radar device 150 may perform radar measurements and present the signal R to the processor 152. The processor 152 may monitor the breathing rate and/or the heart beat rate of the people 70a-70d remaining within the interior 62 by analyzing the radar measurements. Next, in the step 460, the processor 152 may determine a size and/or shape of the people 70a-70d by analyzing the radar measurements. In the step 462, the processor 152 may compare the measured breathing rate, the measured heart rate and the shape/size of the detected people 70a-70d to statistical information. In an example, the measured heart rate data 220b may be compared to the statistical heart beat rate in the age data 220a, the measured breathing rate data 220c may be compared to the statistical breathing rates in the age data 220a and the measured size/shape data in the other data 220n may be compared to the statistical size/shape data in the age data 220a. Next, the method 450 may move to the decision step 464.

In the decision step 464, the processor 152 may determine whether an adult has left the vehicle 60. In an example, the processor 152 may compare the characteristics of the people 70a-70d that are currently in the interior 62 with characteristics of the people 70a-70d that were previously measured within the interior 62 (e.g., while the vehicle 60 was driving) to determine whether an adult has left the vehicle 60. For example, a child leaving the vehicle 60 may be irrelevant to whether another child left in the vehicle 60 is being attended to. If no adult has left the vehicle 60, then the method 450 may move to the step 470. If an adult has left the vehicle 60, then the method 450 may move to the decision step 466.

In the decision step 466, the processor 152 may determine whether a child is in the vehicle 60. For example, if a child has left the vehicle 60 (e.g., parents dropping a child off at school) and no more children remain in the vehicle 60, the alert sound 80 may not be generated. If no children are in the vehicle 60, then the method 450 may move to the step 470. If the child 70 is still within the vehicle 60, then the method 450 may move to the step 468. In the step 468, the processor 152 may perform the distance/motion measurements and/or calculations and determine whether to suppress and/or enable any interventions. For example, if there is no adult attending to the child 70, then the alert sound 80 may be generated, the doors may be unlocked, the HVAC system may be enabled, the windows may be opened, etc. Next, the method 450 may move to the step 470. The step 470 may end the method 450.

Figure 10:
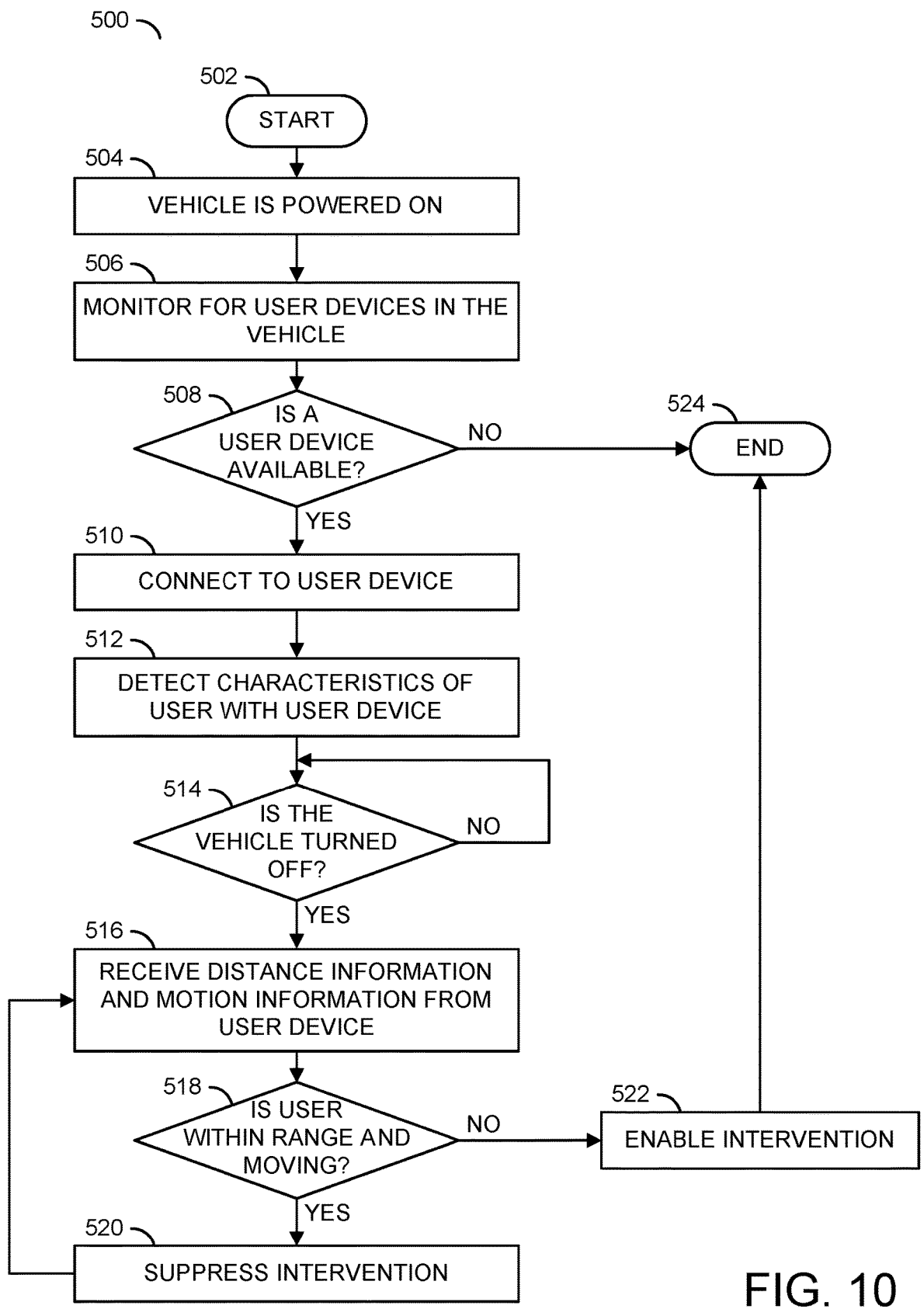
FIG. 10 is a flow diagram illustrating a method for establishing a connection to a user device for determining a distance.

Referring to FIG. 10, a method (or process) 500 is shown. The method 500 may establish a connection to a user device for determining a distance. The method 500 generally comprises a step (or state) 502, a step (or state) 504, a step (or state) 506, a decision step (or state) 508, a step (or state) 510, a step (or state) 512, a decision step (or state) 514, a step (or state) 516, a decision step (or state) 518, a step (or state) 520, a step (or state) 522, and a step (or state) 524.

The step 502 may start the method 500. In the step 504, the vehicle 60 may be powered on (e.g., the people 70a-70d may be in the vehicle 60 and the vehicle 60 may be driving). Next, in the step 506, the wireless module 154 may monitor for any of the user devices 110a-110n in the vehicle 60. Next, the method 500 may move to the decision step 508.

In the decision step 508, the wireless module 154 may determine if any of the user devices 110a-110n are available to connect to. For example, one or more of the user devices 110a-110n may establish a connection with the wireless module 154 with the permission of the people 70a-70d. The application 130 may facilitate connecting with the wireless module 154. If no user devices 110a-110n are available, then the method 500 may move to the step 524 (e.g., there may be no ability to determine the distances D1-D2 and/or the presence signals). If there are one or more of the users devices 110a-110n, then the method 500 may move to the step 510.

In the step 510, the wireless module 154 may establish a connection with the user devices 110a-110n (e.g., pre-connect before the vehicle 60 is turned off). Next, in the step 512, the radar device 150 may perform the radar measurements and the processor 152 may analyze the radar measurements to detect the characteristics of the users (e.g., the people 70a-70d) with the user devices 110a-110n. Next, the method 500 may move to the decision step 514.

In the decision step 514, the processor 152 may determine whether the vehicle 60 has been turned off. If the vehicle 60 is still on (e.g., driving), then the method 500 may return to the decision step 514. If the vehicle 60 is turned off (or the doors have been opened and then closed), then the method 500 may move to the step 516. In the step 516, the wireless module 154 may receive the distance information and/or motion information from the user devices 110a-110n that have established the connection. Next, the method 500 may move to the decision step 518.

In the decision step 518, the processor 152 may determine whether the users 304a-304n are within the range 310 and moving. For example, the processor 152 may calculate the distance information to use as a proxy to determine the distance of the users 304a-304n from the vehicle 60. If at least one of the users 304a-304n are within the range 310 and moving, then the method 500 may move to the step 520. In the step 520, the processor 152 may suppress the intervention (e.g., prevent the alert sound 80). Next, the method 500 may return to the step 516. In the decision step 518, if all of the users 304a-304n are outside of the range 310 or within the range 310 and not moving, then the method 500 may move to the step 522. In the step 522, the processor 152 may enable the intervention (e.g., allow the alert sound 80 to be generated). Next, the method 500 may move to the step 524. The step 524 may end the method 500.

Figure 11:
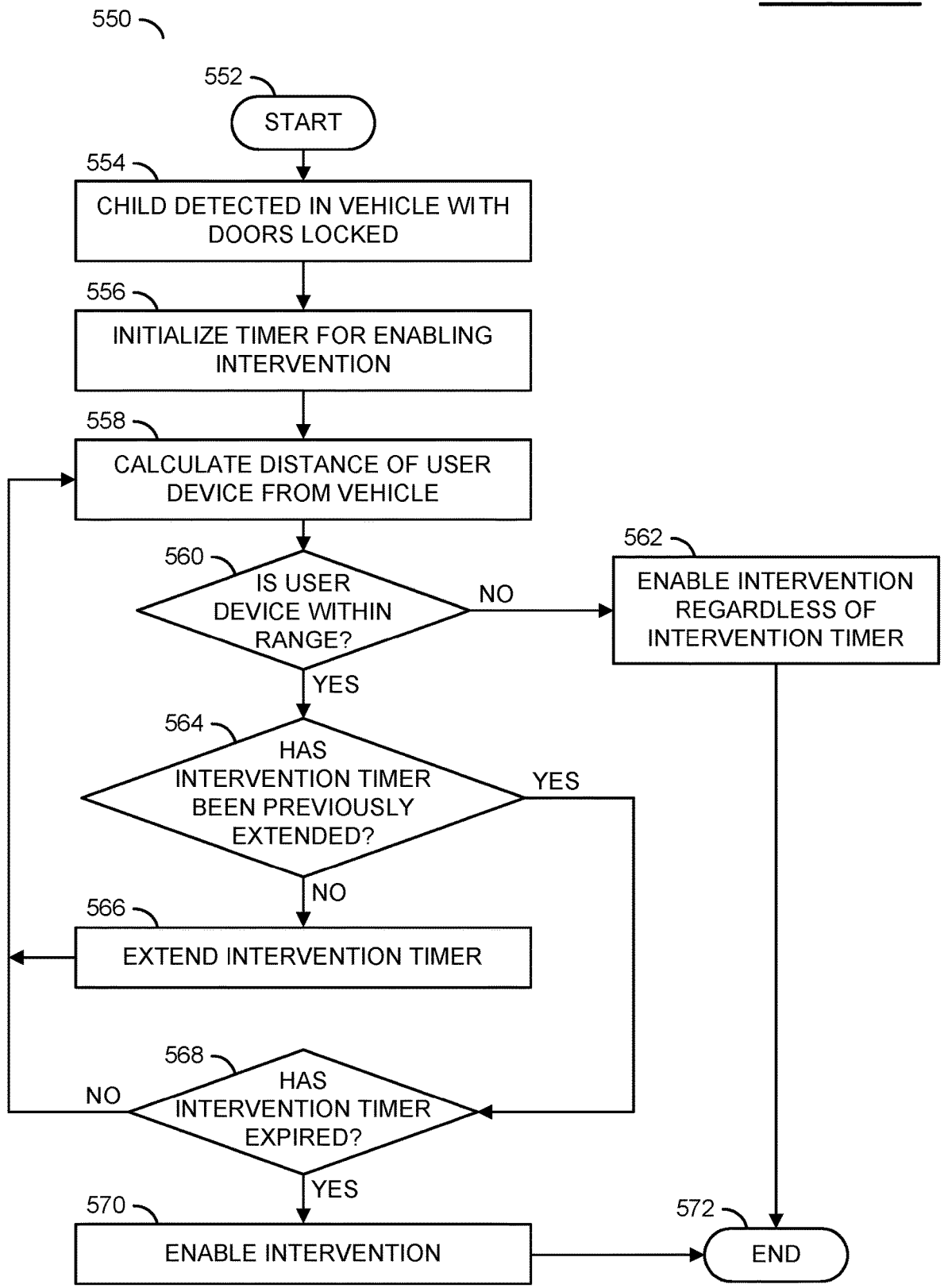

Referring to FIG. 11, a method (or process) 550 is shown. The method 550 may adjust an alert timer in response to detecting whether a child is attended to. The method 550 generally comprises a step (or state) 552, a step (or state) 554, a step (or state) 556, a step (or state) 558, a decision step (or state) 560, a step (or state) 562, a decision step (or state) 564, a step (or state) 566, a decision step (or state) 568, a step (or state) 570, and a step (or state) 572.

The step 552 may start the method 550. In the step 554, the child 70 may be detected in the interior 62 and the locked status of the doors of the vehicle 60 may be received by the processor 152. Next, in the step 556, a timer may be initialized for enabling an intervention. For example, the signal CDETECT may be presented to the alarm 140 to initialize the timer. The timer may provide a delay between when the child 70 is detected in the vehicle 60 and when the intervention is performed (e.g., the alert sound 80 is generated, the doors are unlocked, the windows are rolled down, etc.). In one example, the processor 152 (or the ECU 152') may implement the timer. In another example, the timer may be implemented by the component that performs the intervention (e.g., the alarm 140). In the step 558, the processor 152 may calculate the distance of the user devices 110a-110n from the vehicle 60. Next, the method 550 may move to the decision step 560.

In the decision step 560, the processor 152 may determine whether the user devices 110a-110n are within the range 310 and in motion. If the user devices 110a-110n are not within range and/or are within range but not moving, then the method 550 may move to the step 562. In the step 562, the processor 152 may enable the intervention regardless of any time remaining on the intervention timer. For example, the processor 152 may enable the intervention to be performed before the timer expires based on the determination that no adults are attending to the child. Enabling the intervention before the timer expires may provide an early intervention. Next, the method 550 may move to the step 572. In the decision step 560, if one or more of the user devices 110a-110n are within the range 310 and moving, then the method 550 may move to the decision step 564.

In the decision step 564, the processor 152 may determine whether the intervention timer has been previously extended. For example, the processor 152 may be capable of extending the intervention timer a limited number of times (e.g., to prevent false positive detections of the user devices 110a-110n from indefinitely preventing the interventions). The number of times that the timer may be extended may be varied according to the design criteria of a particular implementation. If the timer has not been previously extended, then the method 550 may move to the step 566. In the step 566, the processor 152 may extend the intervention timer (e.g., present the signal SUPPRESS). Extending the intervention timer may further delay the generation of the intervention while the users 304a-304n are near the vehicle 60. Next, the method 550 may return to the step 558. In the decision step 564, if the intervention timer has been previously extended, then the method 550 may move to the decision step 568.

In the decision step 568, the processor 152 (or the component that implements the intervention such as the alarm 140 or one of the ECUs 142a-142n) may determine whether the intervention timer has expired. If the intervention timer has not expired, then the method 550 may return to the step 558. If the intervention timer has expired, then the method 550 may move to the step 570. In the step 570, the processor 152 may enable the intervention (e.g., the alert sound 80 may be generated). Next, the method 550 may move to the step 572. The step 572 may end the method 550.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
   a radar device configured to (i) operate when a vehicle is turned off, (ii) detect a presence of a person in said vehicle, (iii) determine an age range of said person detected and (iv) generate an alert signal in response to (a) a presence signal and (b) determining that said age range of said person detected corresponds to a child; and
   a mobile device configured to (i) communicate said presence signal to said radar device and (ii) determine a movement of said mobile device, wherein
      (a) said radar device determines a distance of said mobile device from said vehicle in response to said presence signal and
      (b) said radar device suppresses said alert signal when (i) said distance of said mobile device is within a predetermined range of said vehicle and (ii) said mobile device is moving.

2. The system according to claim 1, wherein said radar device is configured to determine said age range of said person detected in response to (a) measuring a heart beat rate and a shape of said person detected and (b) comparing said heart beat rate and said shape measured to known heart beat rates and shapes for said age range.

3. The system according to claim 1, wherein said radar device is configured to determine said age range of said person detected in response to (a) measuring a breathing rate and a shape of said person detected and (b) comparing said breathing rate and said shape measured to known breathing rates and shapes for said age range.

4. The system according to claim 1, wherein said radar device is further configured to (i) detect whether a second person is detected in said vehicle and (ii) suppress said alert signal in response to determining that said age range of said second person corresponds to an adult.

5. The system according to claim 1, wherein said radar device is configured to be operational while (i) said vehicle is off and (ii) and other power consuming components of said vehicle are not operational.

6. The system according to claim 1, wherein (i) said mobile device is a smartphone and (ii) said smartphone is configured to communicate with said radar device using at least one of (a) a Bluetooth connection and (b) a Wi-Fi connection.

7. The system according to claim 1, wherein (i) said mobile device is a smartphone and (ii) said smartphone is configured to communicate with a component of said vehicle using at least one of (a) a Bluetooth connection and (b) a Wi-Fi connection.

8. The system according to claim 1, wherein said radar device suppresses said alert signal for a predetermined amount of time.

9. The system according to claim 1, wherein said alert signal is generated according to regulations for a child detection alarm for said vehicle.

10. The system according to claim 1, wherein (i) said mobile device is a key fob and (ii) said key fob is paired to said vehicle.

11. The system according to claim 1, wherein said predetermined range is a configurable value.

12. The system according to claim 1, wherein said radar device is configured to operate when said vehicle is turned off and doors of said vehicle are locked.

13. The system according to claim 1, wherein (i) said alert signal is configured to be enabled based on a timer that is started after said vehicle is turned off and (ii) said radar device suppresses said alert signal by extending said timer.

14. The system according to claim 1, wherein (i) said radar device comprises a processor and (ii) said processor is configured to (a) receive a radar signal from said radar device, (b) determine said age range of said person detected, (c) receive distance and motion data from a wireless module, (d) calculate said distance and determine whether said mobile device is moving and (e) determine whether to suppress said alert signal.

15. The system according to claim 14, wherein said wireless module is implemented by said radar device.

16. The system according to claim 1, wherein (i) said radar device is configured to present a radar signal to an electronic control unit external to said radar device and (ii) said electronic control unit is configured to (a) determine said age range of said person detected, (b) receive distance and motion data from a wireless module, (c) calculate said distance and determine whether said mobile device is moving and (d) determine whether to suppress said alert signal.

17. The system according to claim 1, wherein (i) said presence signal comprises data that may be used by said radar device to calculate said distance and determine whether said mobile device is moving and (ii) said data of said presence signal is generated by inertial sensors of said mobile device.

18. The system according to claim 1, wherein (i) said mobile device is configured to establish a connection with said radar device while said vehicle is turned on and (ii) said radar device is configured to calculate said distance after said vehicle is turned off using said connection.

19. The system according to claim 18, wherein said connection is established using an application configured to execute on said mobile device.

20. The system according to claim 1, wherein said radar device enters a low power state to conserve power if said child is not detected in said vehicle.

\* \* \* \* \*